United States Patent
Galin et al.

(10) Patent No.: US 12,255,449 B2
(45) Date of Patent: *Mar. 18, 2025

(54) SYSTEM AND METHOD FOR INTERCONNECTED ELEMENTS OF A POWER SYSTEM

(71) Applicant: Solaredge Technologies Ltd., Herzeliya (IL)

(72) Inventors: Yoav Galin, Raanana (IL); Ilan Yoscovich, Givatayim (IL); Guy Sella, Bitan Aharon (IL); Yakir Loewenstern, Ariel (IL); Tzachi Glovinsky, Petah Tikva (IL)

(73) Assignee: Solaredge Technologies Ltd., Herzeliya (IL)

(*) Notice: Subject to any disclaimer, the term of this patent is extended or adjusted under 35 U.S.C. 154(b) by 0 days.

This patent is subject to a terminal disclaimer.

(21) Appl. No.: 18/519,623

(22) Filed: Nov. 27, 2023

(65) Prior Publication Data
US 2024/0097439 A1    Mar. 21, 2024

Related U.S. Application Data

(63) Continuation of application No. 17/153,945, filed on Jan. 21, 2021, now Pat. No. 11,876,369, which is a
(Continued)

(51) Int. Cl.
*H02J 1/10* (2006.01)
*G05F 1/67* (2006.01)
(Continued)

(52) U.S. Cl.
CPC ............ *H02J 1/102* (2013.01); *H02J 3/06* (2013.01); *H02J 3/381* (2013.01); *H02J 3/466* (2020.01);
(Continued)

(58) Field of Classification Search
CPC ..... H02J 1/102; H02J 3/06; H02J 3/381; H02J 3/466; H02J 7/35; H02J 3/38;
(Continued)

(56) References Cited

U.S. PATENT DOCUMENTS

| 6,243,532 B1 | 6/2001 | Wacker et al. |
|---|---|---|
| 10,931,104 B2 | 2/2021 | Galin et al. |

(Continued)

FOREIGN PATENT DOCUMENTS

| CN | 102177404 A | 9/2011 |
|---|---|---|
| CN | 105490372 A | 4/2016 |

(Continued)

OTHER PUBLICATIONS

Sep. 19, 2018—EP Search Report EP App No. 18173775.0.
Feb. 8, 2023—CN Office Action—CN App No. 201810498127.9.

*Primary Examiner* — Carlos Amaya
(74) *Attorney, Agent, or Firm* — Banner & Witcoff, Ltd.

(57) ABSTRACT

A system and a method for a power system that includes a first string portion and a second string portion connected in series. The first string portion may have a first group of power sources connected in series. The second string portion may include a plurality of serially connected devices and a second group of power sources connected to the devices. Each device may be connected to a respective power source of the second group of power sources. By controlling switches that are includes the devices, one or more of the second group of power sources may be disconnected from the first group of power sources in a first mode of operation and/or connected to the first group of power sources in a second mode of operation.

20 Claims, 28 Drawing Sheets

Related U.S. Application Data continuation of application No. 15/980,837, filed on May 16, 2018, now Pat. No. 10,931,104.

(60) Provisional application No. 62/512,218, filed on May 30, 2017.

(51) Int. Cl.

| | | |
|---|---|---|
| *H02J 3/06* | (2006.01) | |
| *H02J 3/38* | (2006.01) | |
| *H02J 3/46* | (2006.01) | |
| *H02J 7/35* | (2006.01) | |
| *H02M 5/02* | (2006.01) | |
| *H02M 7/42* | (2006.01) | |

(52) U.S. Cl.
CPC ............... *H02J 7/35* (2013.01); *H02M 5/02* (2013.01); *H02M 7/42* (2013.01); *G05F 1/67* (2013.01); *H02J 3/38* (2013.01); *H02J 2300/24* (2020.01); *H02J 2300/26* (2020.01)

(58) Field of Classification Search
CPC ...... H02J 2300/24; H02J 2300/26; H02J 3/00; H02J 3/24; H02J 3/385; H02J 13/0075; H02M 5/02; H02M 7/42; G05F 1/67; Y02E 10/56; Y02E 60/00; Y02E 60/7853; Y04S 40/126

See application file for complete search history.

(56) References Cited

U.S. PATENT DOCUMENTS

| | | | |
|---|---|---|---|
| 11,876,369 B2* | 1/2024 | Galin | ............... H02J 3/381 |
| 2010/0265747 A1 | 10/2010 | Egiziano et al. | |
| 2010/0288327 A1 | 11/2010 | Lisi et al. | |
| 2011/0273152 A1 | 11/2011 | Weir | |
| 2012/0139343 A1* | 6/2012 | Adest | ............... H02J 3/381 |
| | | | 307/43 |
| 2012/0194003 A1 | 8/2012 | Schmidt et al. | |
| 2012/0300347 A1 | 11/2012 | Fahrenbruch et al. | |
| 2013/0076144 A1 | 3/2013 | Agamy et al. | |
| 2013/0270915 A1 | 10/2013 | Park et al. | |
| 2013/0335861 A1 | 12/2013 | Laschinski et al. | |
| 2014/0306542 A1 | 10/2014 | Williams | |
| 2014/0327313 A1 | 11/2014 | Arditi et al. | |
| 2016/0164457 A1 | 6/2016 | Robbins | |
| 2016/0254672 A1 | 9/2016 | Yoscovich et al. | |
| 2017/0099031 A1 | 4/2017 | Orr et al. | |
| 2018/0287484 A1 | 10/2018 | Braginsky et al. | |

FOREIGN PATENT DOCUMENTS

| | | |
|---|---|---|
| EP | 2144354 A1 | 1/2010 |
| WO | 2010/068226 A1 | 6/2010 |
| WO | 2013/046658 A1 | 4/2013 |

* cited by examiner

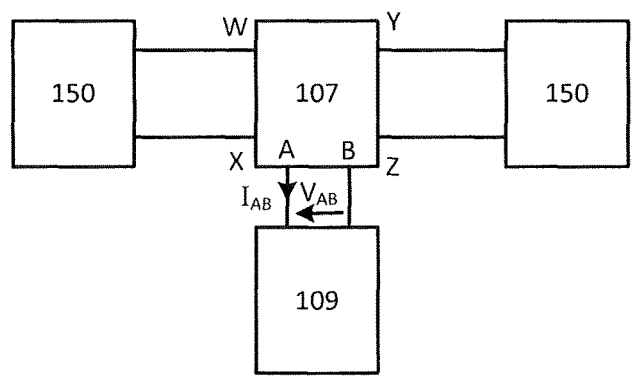
Fig. 1S
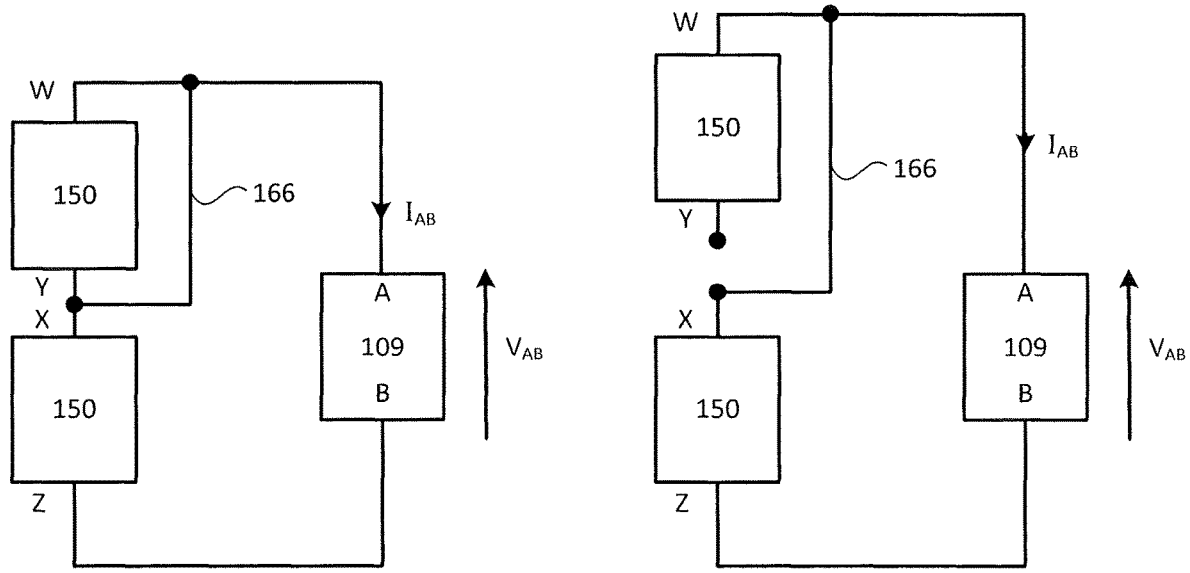
Fig. 1T                    Fig. 1U

| timestamp | Vg1 | Vg2 | Vadj | Vtotal |
|---|---|---|---|---|
| 1 | 760 | 760 | -320 | 1200 |
| 2 | 750 | 750 | -300 | 1200 |
| 3 | 740 | 740 | -280 | 1200 |
| 4 | 730 | 730 | -260 | 1200 |
| 5 | 720 | 720 | -240 | 1200 |
| 6 | 710 | 710 | -220 | 1200 |
| 7 | 700 | 700 | -200 | 1200 |
| 8 | 690 | 690 | -180 | 1200 |
| 9 | 680 | 680 | -160 | 1200 |
| 10 | 670 | 670 | -140 | 1200 |
| 11 | 660 | 660 | -120 | 1200 |
| 12 | 650 | 650 | -100 | 1200 |
| 13 | 640 | 640 | -80 | 1200 |
| 14 | 630 | 630 | -60 | 1200 |
| 15 | 620 | 620 | -40 | 1200 |
| 16 | 610 | 610 | -20 | 1200 |
| 17 | 600 | 600 | 0 | 1200 |

Fig. 6B

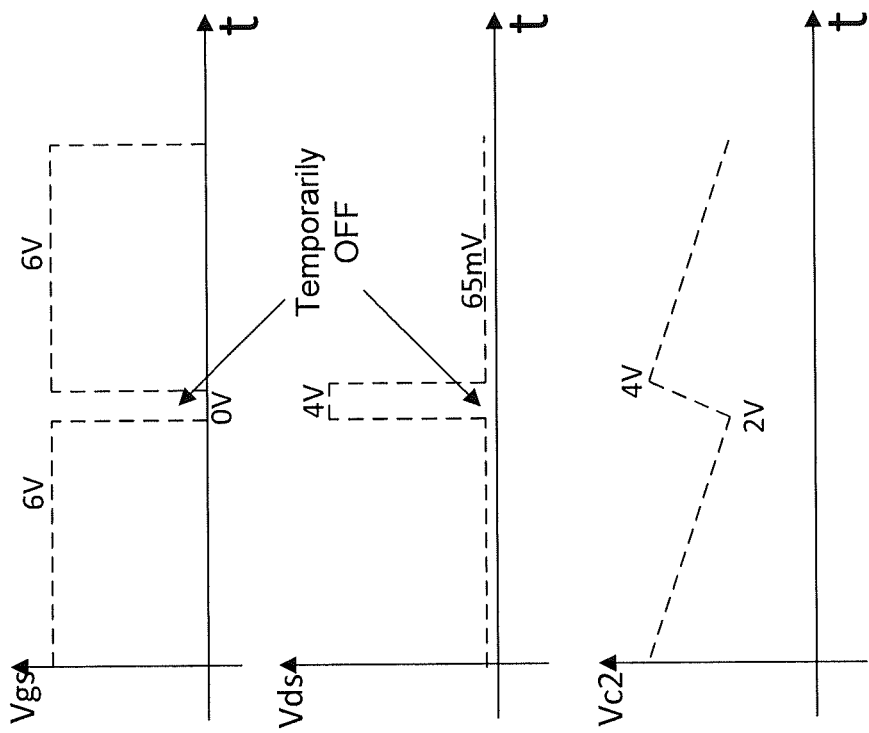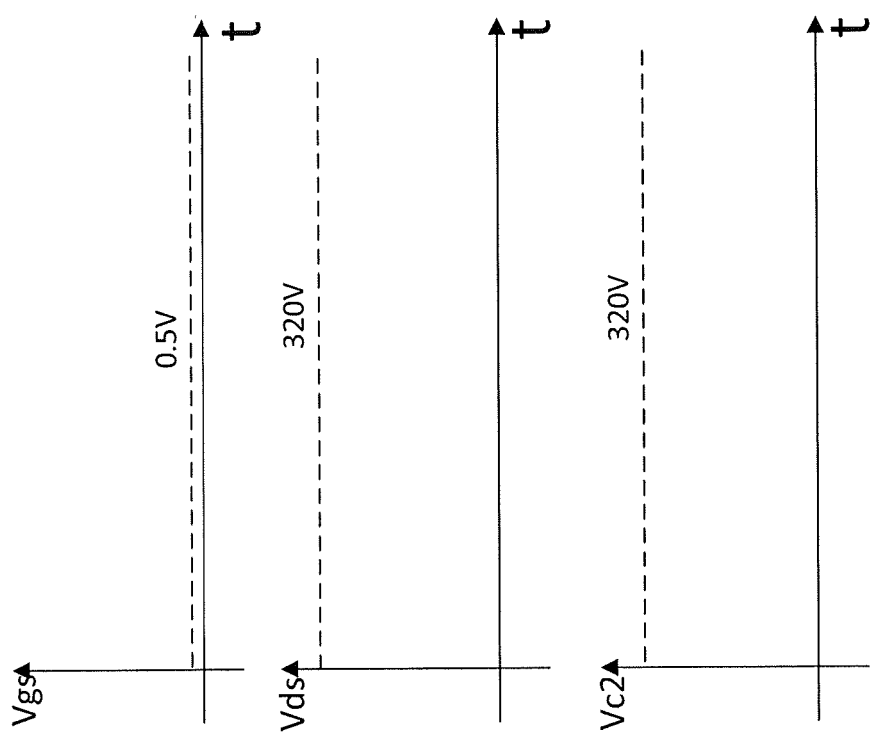
Fig. 7F

SYSTEM AND METHOD FOR INTERCONNECTED ELEMENTS OF A POWER SYSTEM

RELATED APPLICATIONS

This application is a continuation of U.S. application Ser. No. 17/153,945, filed Jan. 21, 2021, which is a continuation of U.S. Application Ser. No. 15/980,837, filed May 16, 2018, now U.S. Pat. No. 10,931,104, which claims priority to U.S. Provisional Application No. 62/512,218, filed May 30, 2017, entitled "System and Method for Interconnected Elements of a Power System," the entire contents of which are incorporated herein by reference for all purposes.

BACKGROUND

A power system having multiple power sources may have different types of power sources, whereby various means of interconnecting these power sources is typically provided. For example, a power system may have one or more renewable power sources such as provided from the sun, wind or ocean waves. And that same power system may have one or more non-renewable power sources such as fuel-powered turbines or generators.

At various times, it may be desirable to switch amongst these various types of power sources, such as at times when the renewable power sources are not capable of providing much power (e.g., low sunlight conditions, or low wind conditions, or low ocean wave conditions).

As such, interconnections amongst the various types of power sources is an important feature in such a power system. According, there is a desire to increase power extraction from the various power sources of a power system by providing for efficient switching between power sources, to ensure safe working voltages and currents in the power system as well as efficient operation of power converters of the power system.

SUMMARY

The following summary may be a short summary of some of the inventive concepts for illustrative purposes only, and may be not intended to limit or constrain the inventions and examples in the detailed description. One skilled in the art will recognize other novel combinations and features from the detailed description.

Illustrative embodiments disclosed herein may be with respect to power sources in a power system and may consider the interconnecting of various groups of power sources. Each group of power sources may contain different types of power derived from both renewable energy sources such as provided from sunlight, wind or wave power, and non-renewable energy sources such as fuel used to drive turbines or generators, for example. Some illustrative embodiments may consider the connecting of DC sources to a load via multiple power devices.

Illustrative embodiments disclosed herein may include a power system used to supply power to a load and/or a storage device. The power system may include various interconnections of groups of direct currents (DC) from power sources that also may be connected in various series, parallel, series parallel, and parallel series combinations, for example.

As noted above, this Summary may be merely a summary of some of the features described herein. It may be not exhaustive, and it may be not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

FIG. 1S shows a circuit, according to one or more illustrative embodiments.

FIGS. 1T and 1U show further features of a switch unit shown by the circuit of FIG. 1S, according to one or more illustrative embodiments.

FIG. 5I is a flow chart illustrating a method for selecting a preferred number of power devices for connecting to a string, according to one or more illustrative embodiments.

FIG. 6B is a table that provides a numerical example of values that may be measured during operation of a power system, according to one or more illustrative embodiments.

FIG. 7F shows a timing diagram for operating the auxiliary power circuit of FIG. 7E, according to one or more illustrative embodiments.

Figure 1A:
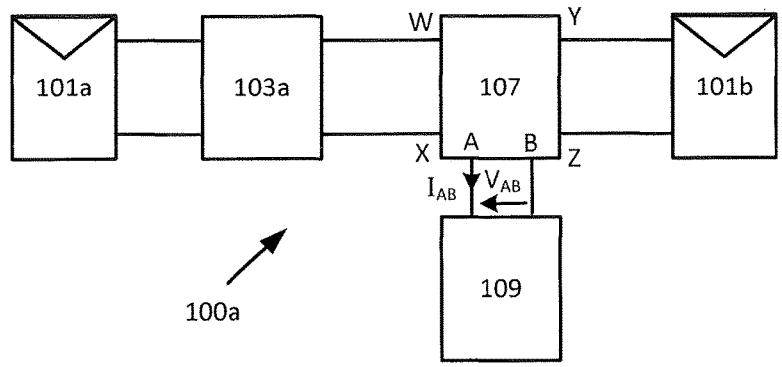
FIG. 1A shows a block diagram of a power system, according to illustrative embodiments.

These and other features, aspects, and advantages of the present disclosure will become better understood with regard to the following description, claims, and drawings. The present disclosure may be illustrated by way of example, and not limited by, the accompanying figures.

DETAILED DESCRIPTION

In the following description of various illustrative embodiments, reference may be made to the accompanying drawings, which form a part hereof, and in which may be shown, by way of illustration, various embodiments in which aspects of the disclosure may be practiced. It may be to be understood that other embodiments may be used and structural and functional modifications may be made, without departing from the scope of the present disclosure.

By way of introduction, features of illustrative embodiments may be directed to a design of a power system and a subsequent operation of the power system. The power system may, by non-limiting example, include multiple interconnected power sources such as photovoltaic generators (e.g., one or more photovoltaic cells, cell substrings, panels, panel strings, batteries, generators and wind turbines. The power system may also include solar roofing which may include solar tiles which are referred to in the solar industry as solar shingles and/or photovoltaic shingles which are solar panels designed to look like and function as conventional roofing materials, such as asphalt shingle or slate, while also producing electricity. The design of the power system and subsequent operation of the power system, may allow for a dynamic configuration of the power system that may be responsive to conditions such as level of solar irradiance, temperature, wind speed, load demands, power cost, feed-in tariffs, fuel supply levels, and fuel costs. Specifically, switching units may be disposed between banks of power sources to provide either a series or a parallel connection between the power sources. The series or the parallel connection may provide a configurable voltage and/or current to be applied to a power converter and/or a load such as a motor or a battery, for example. The power converter may be direct current (DC) to DC converter, DC to alternating current (AC) converter, or an AC to AC converter. The configurable voltage and/or current applied to a power converter may be further configured and further adjusted by utilization of power devices that may be operatively attached to some of the power sources. The configurable voltage and/or current applied to a power converter may be further configured and further adjusted in order, for example, to increase power extraction from the power sources, to ensure safe working voltages and currents in the power system as well as efficient operation of the power converters.

By way of non-limiting example of a power system that includes photovoltaic generators and/or power devices, an initial design of the power system includes determining the maximum number of photovoltaic generators and/or power devices per a series string. An initial calculation may be to consider an input voltage rating of a power converter connected to the series string or a regulatory maximum voltage of the series string and divide the input voltage by an open circuit voltage of a photovoltaic generator and/or power device. For example, a maximum series voltage may be 1200V. and a maximum generator output voltage may be about 50V, so an initial design may be to connect 1200/50=24 panels in series.

A possible risk of the initial calculation is to oversize and/or undersize the number of photovoltaic generators and/or power devices per a series string. The possible risk of the initial design may be a failure to consider the location of the power system as well to take into consideration the selection of the photovoltaic generators and/or power devices. The selection may consider parameters such as photovoltaic cell temperature from standard test conditions, the temperature coefficients of open circuit voltages of photovoltaic generators and/or power devices, as well as the temperature coefficients of maximum power point voltages of photovoltaic generators and/or power devices. The possible risk may also fail to consider the subsequent operation of the power system. Significant shading for significant periods of time of the photovoltaic generators may mean that the number of photovoltaic generators and/or power devices per a series string may be insufficient to enable the efficient operation of a power converter connected to the series string. Whereas, significantly increased solar irradiance at certain points in the year may result in over voltage and/or current from too many photovoltaic generators and/or power devices in a string. The over voltage and/or current from too many photovoltaic generators might not allow the efficient operation of a power converter connected to the series string. The over voltage and/or current from too many photovoltaic generators may not also satisfy safety requirements for the maximum allowed voltages and/or currents specified by law for power systems.

Certain photovoltaic generators may have an open-circuit voltage (Voc) and a low-load voltage that is substantially higher than a maximum-power-point voltage (Vmpp). For example, a 60-cell photovoltaic panel may have Voc=50V, and Vmpp=32V. If a maximum allowed string voltage is 1000V, calculating the length of a series string of panels may indicate that 1000/50=20 panels should be serially connected, to protect against going over the 1000V limit during open-circuit conditions. However, during maximum-power conditions, floor (1000/32)=31 panels may be serially connecting. Limiting the string to 20 panels for open-circuit (or limited-load) scenarios may reduce the amount of power produced under maximum-power conditions.

Thus, there may be a need for and an advantage to providing a system and method for a configuration of a power system responsive to the operating conditions of the system that satisfies a criterion for the power system. The criterion may include efficient operation of power converters, increased power production, safe operating voltages and currents of the power system, and to enable to decrease and/or increase power extraction from power sources.

The term "multiple" as used here in the detailed description indicates the property of having or involving several parts, elements, or members. The claim term "a plurality of" as used herein in the claims section finds support in the description with use of the term "multiple" and/or other plural forms. Other plural forms may include for example regular nouns that form their plurals by adding either the letter 's' or 'es' so that the plural of converter is converters or the plural of switch is switches for example.

Reference is made to FIG. 1A, which shows a block diagram of a power system 100a, according to illustrative embodiments. Power source 101a is shown connected to the input of power device 103a. Power sources 101a/101b may provide DC derived from photovoltaic generators, wind turbines, battery banks, or petrol generators, for example. Power sources 101a/101b may provide AC that may be converted to DC by power device 103a. Power device 103a may include a power circuit. The power circuit may include a direct current-direct current (DC-DC) converter such as a Buck, Boost, Buck/Boost, Buck+Boost, Cuk, Flyback and/or forward converter, or a charge pump. In some embodiments, the power circuit may include a DC-AC converter (also known as an inverter), such as a micro-inverter. The output of power device 103a connects to the input of switch unit 107 at terminals W and X. A second power source 101b connects to the input of switch unit 107 at terminals Y and Z. The input of load 109 connects to the output of switch unit 107 at terminals A and B of switch unit 107. The output of switch unit 107 at terminals A and B provides a voltage ($V_{AB}$) and current input ($I_{AB}$) to load 109. Load 109 may be a DC-DC converter, a DC-AC inverter, a storage device such as a battery, or an electric motor for example. Load 109 may also be a combiner box designed to receive power from multiple power sources (e.g., one or more strings or interconnections of power sources) and to provide the power to a different load (e.g., a DC/AC or DC/DC power converter). Where load 109 may be a DC-DC converter, a DC-AC inverter as an additional load may be connected to their respective outputs. The additional load may be an electric motor or a utility grid, for example.

In some embodiments, switch unit 107 may be adapted to receive more than two power source inputs. For example, switch unit 107 may have 3, 4, 10 or even 20 power source inputs, and may be arrange to internally connect the power sources in a series, parallel or mixed series-parallel arrangement.

Figure 1B:
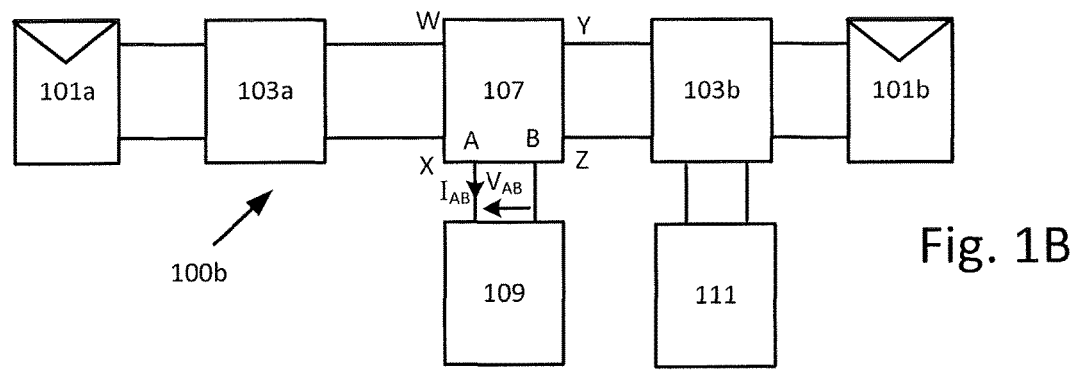
FIG. 1B shows a block diagram of a power system, according to illustrative embodiments.

Reference is made to FIG. 1B, which shows a block diagram of a power system 100b, according to illustrative embodiments. Power system 100b is similar to power system 100a but includes a power device 103b with an input connected to power source 101b and an output connected to the input of switch unit 107 at terminals Y and Z. Power device 103b may be the same as power device 103a described above, and/or may additionally include a connection to storage device 111 that may be a battery, for example. A feature of power device 103b may be to convert power produced by power sources to be stored in storage device 111 or to convert power stored in storage device 111 to be used by load 109. Alternatively, where load 109 is an AC to DC converter connected to a utility grid, power device 103b may convert power from the utility grid to be stored in storage device 111.

According to further embodiments with respect FIGS. 1A and 1B, multiple power sources 101a/101b may connected in series or in parallel with and/or without any power devices 103a/103b. The further embodiments with respect FIGS. 1A and 1B are shown in greater detail in the descriptions which follow.

Figure 1C:
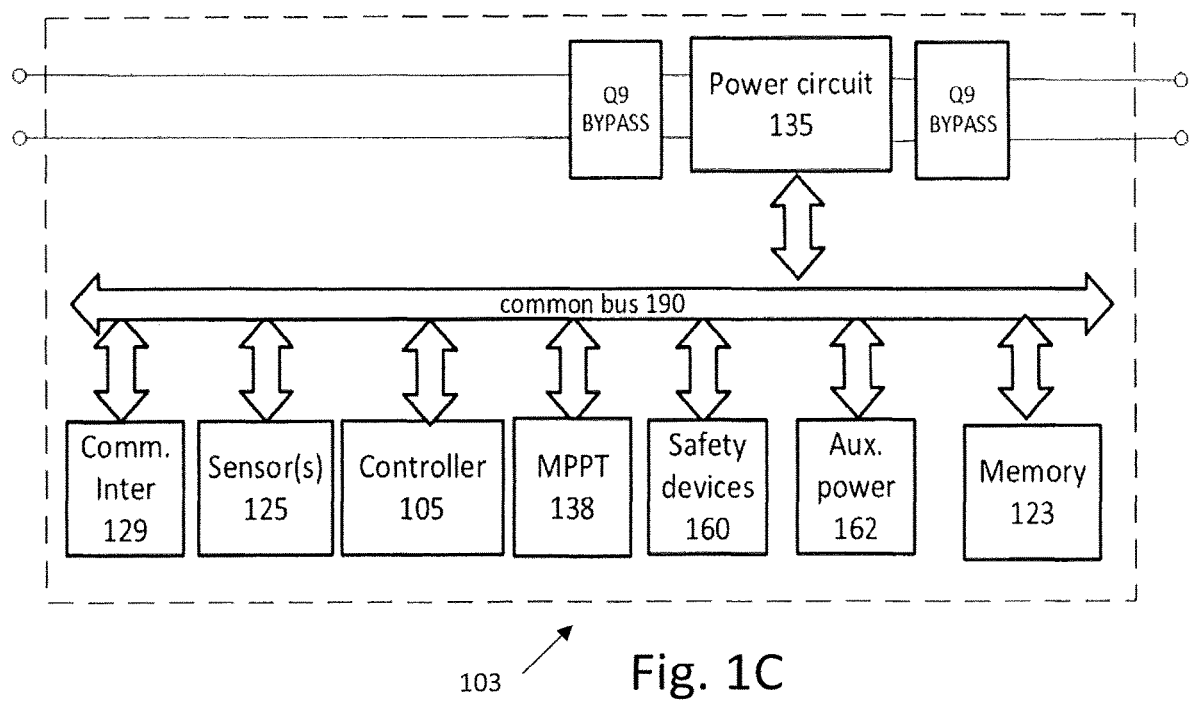
FIG. 1C illustrates circuitry that may be found in a power device according to illustrative embodiments.

Reference is now made to FIG. 1C, which illustrates circuitry which may be found in a power device such as power device 103, according to illustrative embodiments. Power device 103 may be similar to or the same as power devices 103a/103b shown in FIGS. 1A and 1B. In some embodiments, power device 103 may include power circuit 135. Power circuit 135 may include a direct current-direct current (DC/DC) converter such as a Buck, Boost, Buck/Boost, Buck+Boost, Cuk, Flyback and/or forward converter, or a charge pump. In some embodiments, power circuit 135 may include a direct current—alternating current (DC/AC) converter (also known as an inverter), such as a micro-inverter. Power circuit 135 may have two input terminals and two output terminals, which may be the same as the input terminals and output terminals of power device 103. In some embodiments, power device 103 may include Maximum Power Point Tracking (MPPT) circuit 138, configured to extract increased power from a power source.

In some embodiments, power circuit 135 may include MPPT functionality. In some embodiments, MPPT circuit 138 may implement impedance matching algorithms to extract increased power from a power source. Power device 103 may further include controller 105 such as an analog controller, microprocessor, Digital Signal Processor (DSP), Application-Specific Integrated Circuit (ASIC), and/or a Field Programmable Gate Array (FPGA).

Still referring to FIG. 1C, controller 105 may control and/or communicate with other elements of power device 103 over common bus 190. In some embodiments, power device 103 may include circuitry and/or sensors/sensor interfaces 125 configured to measure parameters directly or receive measured parameters from connected sensors and/or sensor interfaces 125 configured to measure parameters on or near the power source, such as the voltage and/or current output by the power source and/or the power output by the power source. In some embodiments, the power source may be a photovoltaic (PV) generator comprising PV cells, and a sensor or sensor interface may directly measure or receive measurements of the irradiance received by the PV cells, and/or the temperature on or near the PV generator.

Still referring to FIG. 1C, in some embodiments, power device 103 may include communication interface 129, configured to transmit and/or receive data and/or commands from other devices. Communication interface 129 may communicate using Power Line Communication (PLC) technology, acoustic communications technology, or additional technologies such as ZIGBEE™, Wi-Fi, BLUETOOTH™, cellular communication or other wireless methods. Power Line Communication (PLC) may be performed over power lines between power devices 103 and load 109, which may include as similar communication interface as communication interface 129.

In some embodiments, power device 103 may include memory 123, for logging measurements taken by sensor(s)/sensor interfaces 125 to store code, operational protocols or other operating information. Memory 123 may be a flash memory, an Electrically Erasable Programmable Read-Only Memory (EEPROM), a Random Access Memory (RAM), a Solid State Devices (SSD), or other types of appropriate memory devices.

Still referring to FIG. 1C, in some embodiments, power device 103 may include safety devices 160 (e.g., fuses, circuit breakers and Residual Current Detectors). Safety devices 160 may be passive or active. For example, safety devices 160 may include one or more passive fuses disposed within power device 103 where the element of the fuse may be designed to melt and disintegrate when excess current above the rating of the fuse flows through it, to thereby disconnect part of power device 103 so as to avoid damage. In some embodiments, safety devices 160 may include active disconnect switches, configured to receive commands from a controller (e.g., controller 105, or an external controller) to short-circuit and/or disconnect portions of power device 103, or configured to short-circuit and/or disconnect portions of power device 103 in response to a measurement measured by a sensor (e.g., a measurement measured or obtained by sensors/sensor interfaces 125). In some embodiments, power device 103 may include auxiliary power circuit 162, configured to receive power from a power source connected to power device 103, and output power suitable for operating other circuitry components (e.g., controller 105, communication interface 129, etc.). Communication, electrical connecting and/or data-sharing between the various components of power device 103 may be carried out over common bus 190.

Power device 103 may include or be operatively attached to a maximum power point tracking (MPPT) circuit. The MPPT circuit may also be operatively connected to controller 105 or another controller 105 included in power device 103 that may be designated as a primary controller. A primary controller in power device 103 may communicatively control one or more other power devices 103 that may include controllers known as secondary controllers. Once a primary/secondary relationship may be established, a direction of control may be from the primary controller to the secondary controllers. The MPPT circuit under control of a primary and/or central controller 105 may be used to increase power extraction from power sources 101a/101b and/or to control voltage and/or current supplied to a load.

Referring still to FIG. 1C, in some embodiments, power device 103 may include bypass unit Q9 coupled between the inputs of power circuit 135 and/or between the outputs of power circuit 135. Bypass unit Q9 and/or power circuit 135 may be a junction box to terminate power lines or to provide a safety feature such as fuses or residual current devices. Bypass unit Q9 may also be an isolation switch, for example. Bypass units Q9 may be controlled by controller 105. If an unsafe condition is detected, controller 105 may set bypass unit Q9 to ON, short-circuiting the input and/or output of power circuit 135. In a case in which the pair of power sources 101a/101b are photovoltaic (PV) generators, each PV generator provides an open-circuit voltage at its output terminals. When bypass unit Q9 is ON, a PV generators may be short-circuited, to provide a voltage of about zero to power circuit 135. In both scenarios, a safe voltage may be maintained, and the two scenarios may be staggered to alternate between open-circuiting and short-circuiting PV generators. This mode of operation may allow continuous power supply to system control devices, as well as provide backup mechanisms for maintaining a safe voltage (i.e., operation of bypass unit Q9 may allow continued safe operating conditions).

Figure 1D:
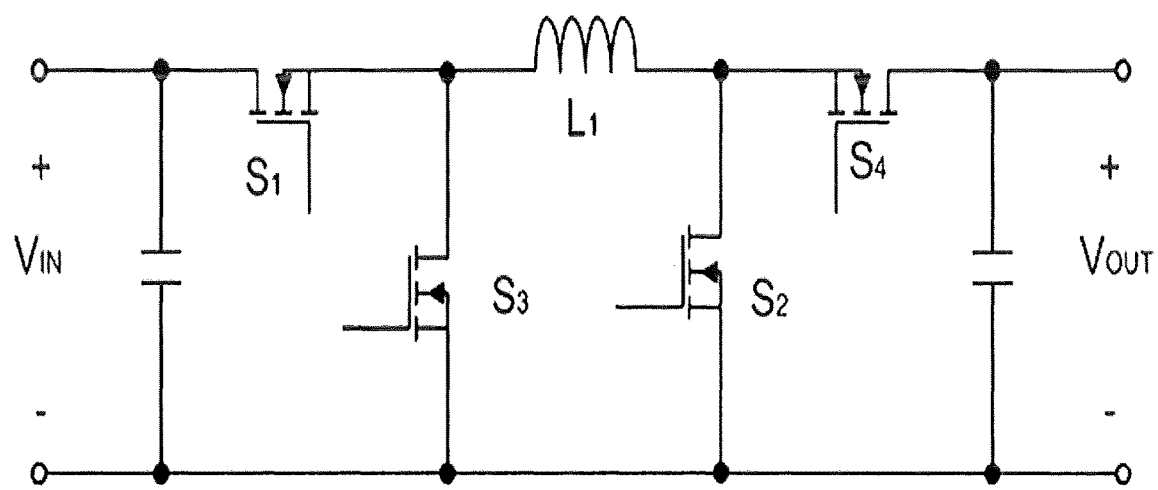
FIG. 1D shows a buck+boost circuit for a power device, according to one or more illustrative embodiments.

Reference is now made to FIG. 1D, which shows a buck+boost circuit implementation 135a for power circuit 135, according to one or more illustrative embodiments. The buck+boost circuit implementation 135a for power circuit 135 uses metal oxide semi-conductor field effect transistors (MOSFETs) for switches S1, S2, S3 and S4. The sources of switches S1, S2, S3 and S4 are referred to as first terminals, the drains of switches S1, S2, S3 and S4 are referred to second terminals and the gates of switches S1, S2, S3 and S4 are referred to as third terminals. Capacitor C1 may be connected in parallel across the respective positive (+) and negative (−) input terminals C and D of the buck+boost circuit where the voltage may be indicated as VIN. Capacitor C2 may be connected in parallel across the respective positive (+) and negative (−) output terminals A and B of the buck+boost circuit where the voltage may be indicated as VOUT. First terminals of switches S3 and S2 may connect to the common negative (−) output and input terminals of the buck+boost circuit. A second terminal of switch S1 may connect to the positive (+) input terminal and a first terminal of switch S1 may connect to a second terminal of switch S3. A second terminal of switch S4 may connect to the positive (+) output terminal and a first terminal of switch S4 may connect to the second terminals of switch S2. Inductor L1 may connect respectively between the second terminals of switches S3 and S4. Third terminals of switches S1, S2, S3 and S4 may be operatively connected to controller 105 of FIG. 1C.

Switches S1, S2, S3 and S4 and description of switches that follow may be implemented using semi-conductor devices, for example, metal oxide semiconductor field effect transistors (MOSFETs), insulated gate bipolar transistors (IGBTs), bipolar junction transistors (BJTs), Darlington transistor, diode, silicon controlled rectifier (SCR), Diac, Triac or other semi-conductor switches known in the art. Using by way of example, switches S1, S2, S3 and S4 may be implemented by use of bipolar junction transistors where the collectors, emitters and bases may refer to first terminals, second terminals and third terminals described and defined above. Switches S1, S2, S3 and S4 may be implemented using mechanical switch contacts such as hand operated switches or electro-mechanically operated switches such as relays, for example.

Figure 1E:
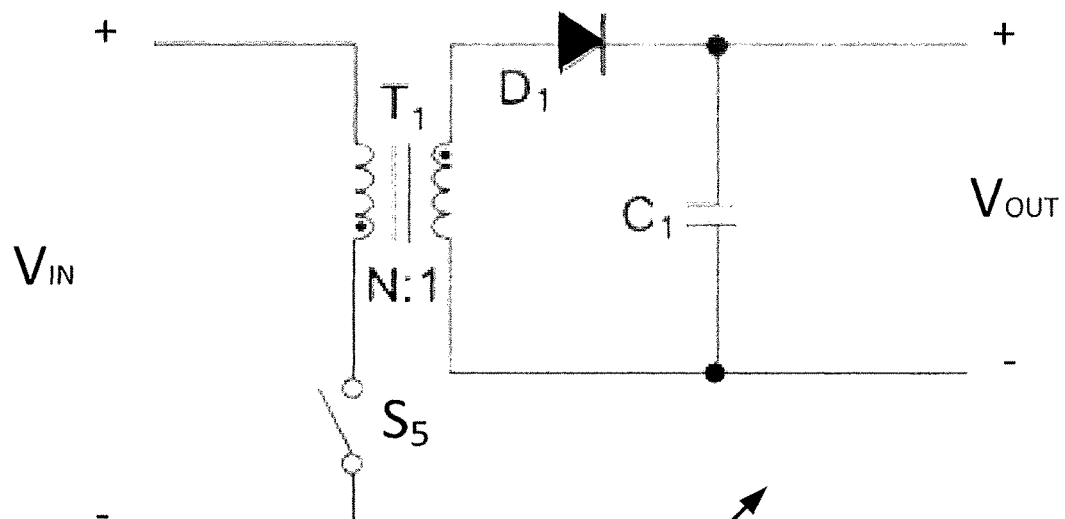
FIG. 1E shows an isolated converter for a power circuit, according to one or more illustrative embodiments.

Reference is now made to FIG. 1E, which shows an isolated boost circuit 135b for power circuit 135, according to one or more illustrative embodiments. The positive (+) and negative (−) terminals has a voltage VIN applied across a switch $S_5$ which is in series with the primary winding of a transformer $T_1$. The secondary winding of transformer $T_1$ has one end connected to the anode of diode $D_1$. The cathode of diode $D_1$ provides the positive (+) of output of voltage $V_{OUT}$ and also connects to one end of capacitor C1. The other end of capacitor C1 connects to the other end of the secondary winding of transformer $T_1$ and also provides the negative (−) of output of voltage $V_{OUT}$. Boost circuit 135b may be implemented in power device 103a/103b in order to provide galvanic isolation between respective sides of switch unit 107.

Figure 1F:
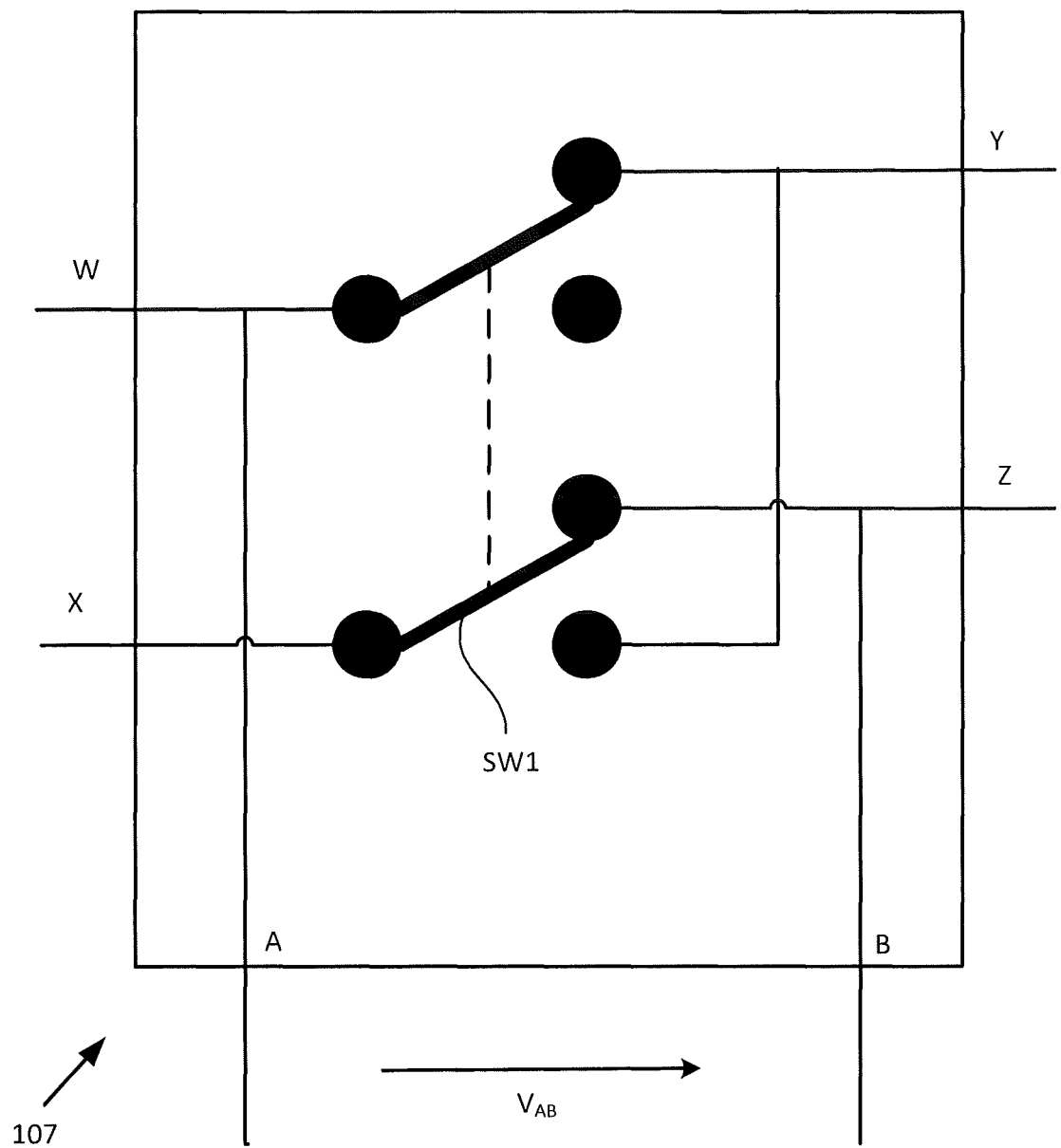
FIG. 1F shows further details of a switch unit, according to one or more illustrative embodiments.

Reference is now made to FIG. 1F, which shows further details of an embodiment for switch unit 107 according to one or more illustrative embodiments. Switch SW1 of switch unit 107 is a double pole double throw (DPDT) switch. Switch SW1 in a first position as shown connects terminals W, X in parallel with terminals Y, Z. Switch SW1 in the other second position connects terminals W, X in series with terminals Y, Z. Switch SW1 may be implemented using an electro mechanical relay or as a solid state electronic switch implementation. A third position of switch SW1 may alternatively isolate power/voltage/current on terminals W, X and/or terminals Y, Z so that power/voltage/current does not appear on terminals A and B.

Figure 1G:
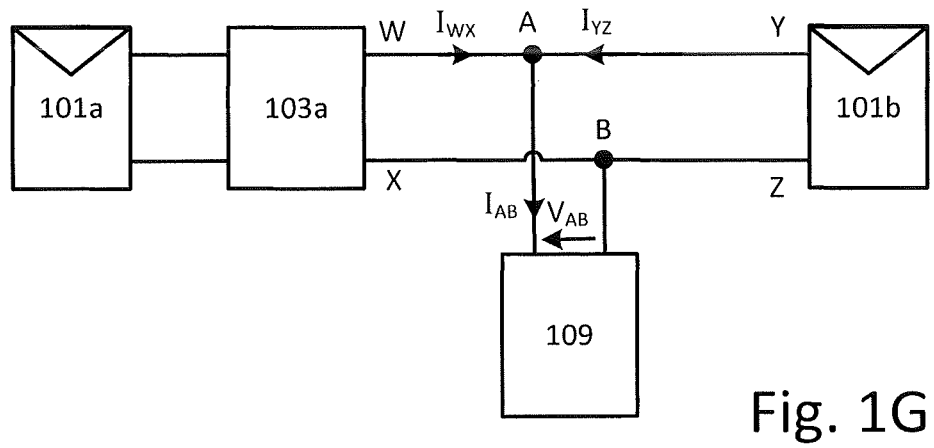
FIGS. 1G and 1H show circuits according to one or more illustrative embodiments.
Figure 1H:
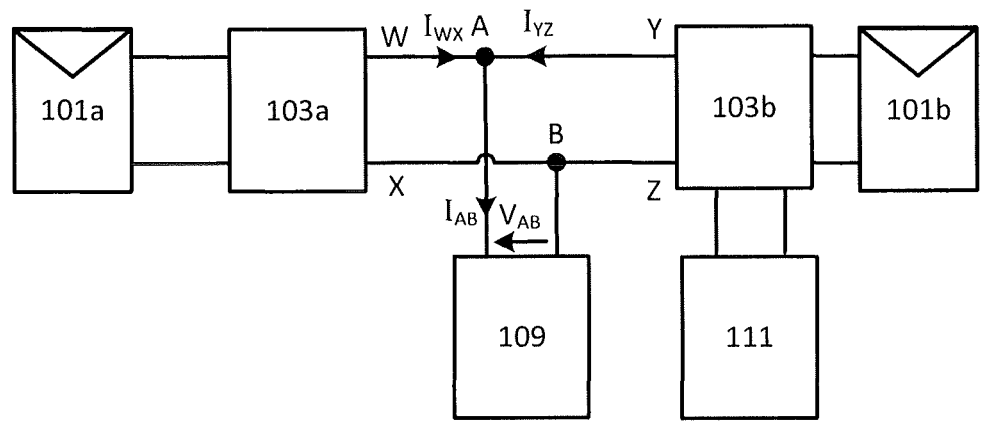

Reference is now made to FIGS. 1G and 1H, which show respective circuits that are as a result of the embodiment of switch unit 107 (shown as in FIG. 1F), when switch SW1 may be in the first position, according to one or more illustrative embodiments. FIGS. 1G and 1H. Switch SW1 in the first position connects terminals W, X in parallel with terminals Y, Z.

With respect to FIG. 1G, the output of power device 103a is connected in parallel with power source 101b. The input of power device 103a is connected to power source 101a.

With respect to FIG. 1H, the output of power device 103a is connected in parallel with to power device 103b at terminals W and Z. The input of power device 103a is connected to power source 101a and power source 101b connects to the input of power device 103b. A feature of power device 103b may be to convert power produced by power source 101b to be stored in storage device 111 or to convert power stored in storage device 111 to be used by load 109. Alternatively, where load 109 may include an AC to DC converter connected to a utility grid, power device 103b may convert power from the utility grid to be stored in storage device 111.

With respect to both FIGS. 1G and 1H where power devices 103a and 103b are similar to power device 103 described by FIG. 1C, power devices 103a and 103b may be used in a utilization to monitor and sense by sensors and/or sensor interfaces 125, use MPPT circuit 138 and bypass unit Q9. The utilization in conjunction with a control algorithm run by controller 105, may provide voltage ($V_{AB}$) and current input ($I_{AB}$) to load 109 at levels that may be predetermined and/or dynamically determined.

Figure 1I:
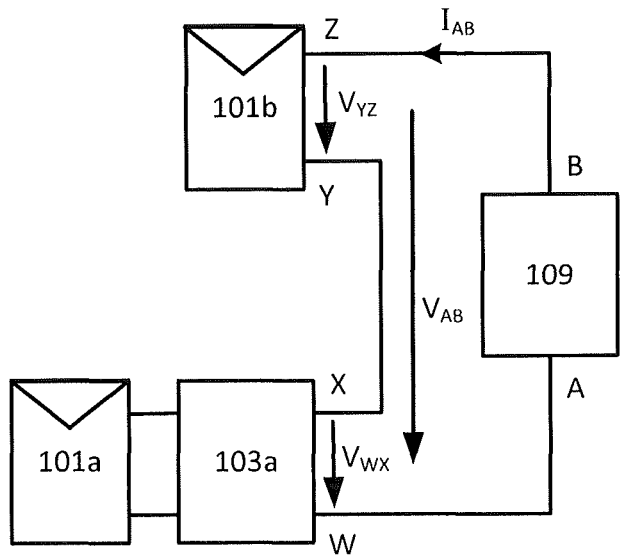
FIGS. 1I and 1J show circuits according to one or more illustrative embodiments.
Figure 1J:
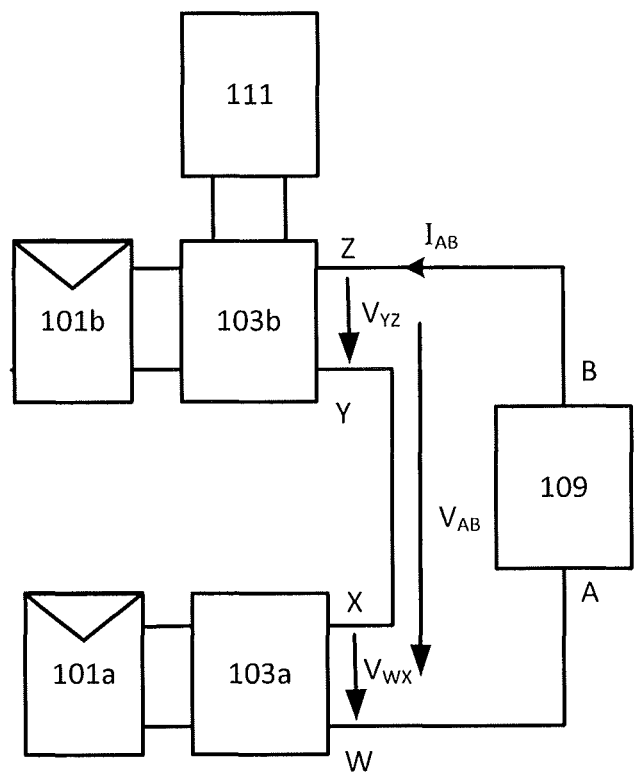

Reference is now made to FIGS. 1I and 1J, which show circuits that may be configured as shown as a result of operation of switch unit 107 (shown as in FIG. 1F) when switch SW1 may be in the second position, according to one or more illustrative embodiments. Switch SW1 in the second position may connect terminals W, X in series with terminals Y, Z.

With respect to FIG. 1I, the output of power device 103a is connected in series with power source 101b. The input of power device 103a is connected to power source 101a.

With respect to FIG. 1J, the output of power device 103a is connected in series with terminals of power device 103b between terminals W and Z. The input of power device 103a is connected to power source 101a and power source 101b connects to the input of power device 103b. A feature of power device 103b may be to convert power produced by power source 101b to be stored in storage device 111 or to convert power stored in storage device 111 to be used by load 109. Alternatively, where load 109 may include an AC to DC converter connected to a utility grid, power device 103b may convert power from the utility grid to be stored in storage device 111.

With respect to both FIGS. 1I and 1J where power devices 103a and 103b are similar to power device 103 described by FIG. 1C, power devices 103a and 103b may be used in a utilization to monitor and sense by sensors and/or sensor interfaces 125, use MPPT circuit 138 and bypass unit Q9. The utilization in conjunction with a control algorithm run by controller 105, may provide voltage ($V_{AB}$) and current input ($I_{AB}$) to load 109 at levels which may be predetermined and/or dynamically determined.

Figure 1K:
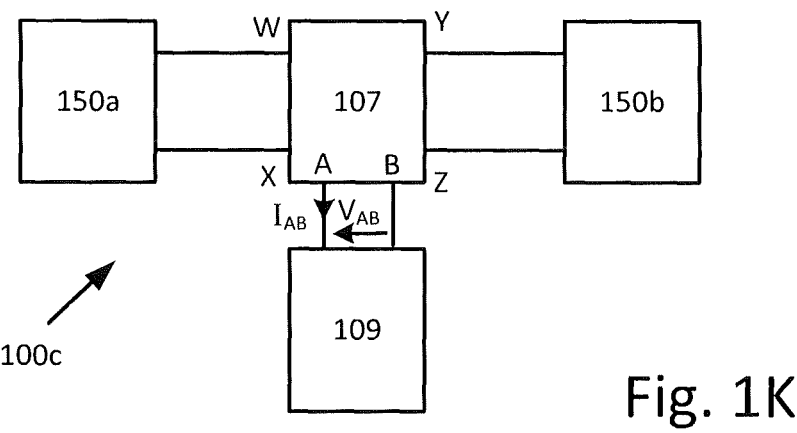
FIG. 1K shows a power system, according to one or more illustrative embodiments.

Reference is now made to FIG. 1K, which shows power system 100c, according to one or more illustrative embodiments. Interconnections 150a and 150b connect at respective inputs of switch unit 107 at terminals W. X and Y, Z. Load 109 connects to the output of switch unit 107 at terminals A and B. The voltage across terminals A and B is $V_{AB}$ and current input to load 109 is $I_{AB}$.

Figure 1L:
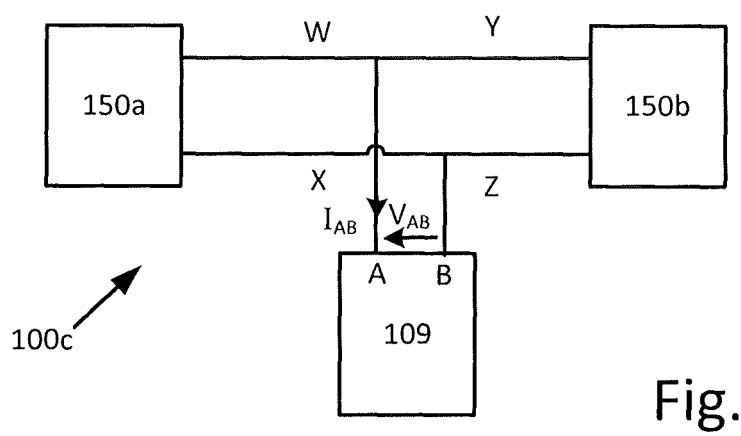
FIG. 1L shows a power system, according to one or more illustrative embodiments.

Reference is now made to FIG. 1L, which shows a power system 100c, when switch SW1 is in first position, according to one or more illustrative embodiments. Switch SW1 in first position connects the outputs of interconnections 150a and 150b in parallel. Load 109 connects to the parallel connection of the outputs of interconnections 150a and 150b.

Figure 1M:
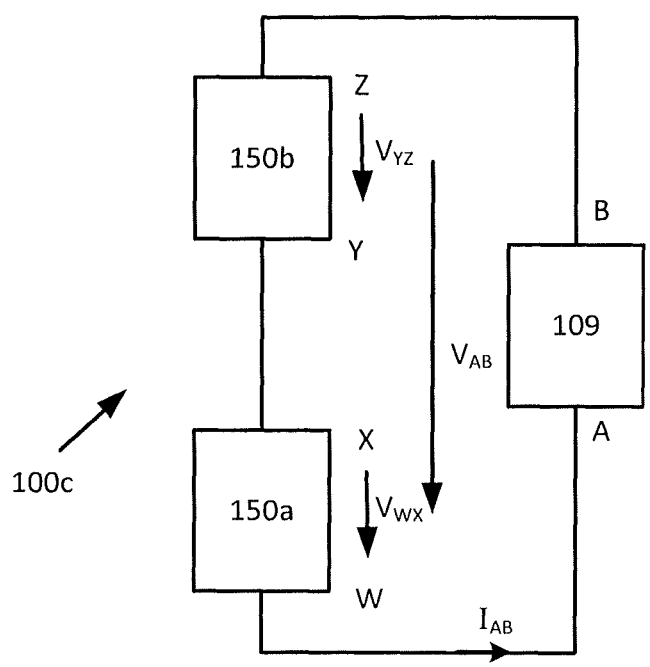
FIG. 1M shows a power system, according to one or more illustrative embodiments.

Reference is now made to FIG. 1M, which shows a power system 100c, when switch SW1 is in second position, according to one or more illustrative embodiments. Switch SW1 in second position connects the outputs of interconnections 150a and 150b in series. Load 109 connects across the series connection of the outputs of interconnections 150s and 150b.

Figure 1N:
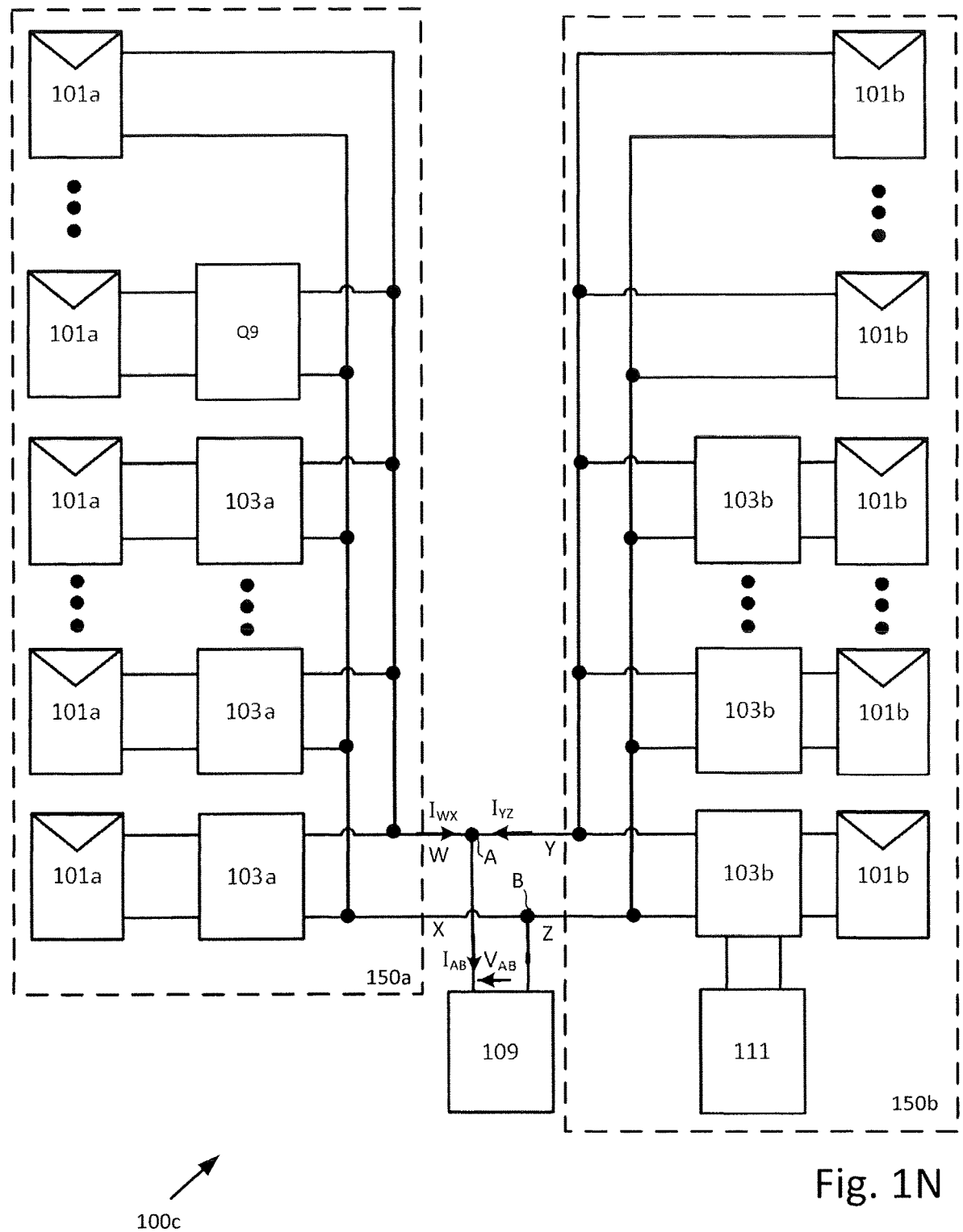
FIG. 1N shows more details of a power system, according to one or more illustrative embodiments.

Reference is now made to FIG. 1N, which shows more details of power system 100c, according to one or more illustrative embodiments. The circuit of FIG. 1N may be formed by operating switch unit 107, shown as in FIG. 1F, when switch SW1 is in the first position. Switch SW1 in the first position may connect terminals W. X in parallel with terminals Y, Z. The circuit of FIG. 1N may further contain in circuit interconnection 150a, multiple power sources 101a connected to the inputs of power devices 103a, where the outputs of power devices 103a are connected in parallel together across terminals W and X. Alternatively another power source 101a may connect to the input of bypass unit Q9 that may have an output which may be connected across terminals W and X. Alternatively, yet another power source 101a may connect across terminals W and X. Bypass unit Q9 may be used to disconnect power source 101a from across terminals W and X.

Similarly, circuit interconnection 150b includes multiple power sources 101b connected to the inputs of power devices 103b, where the outputs of power devices 103b are connected in parallel together across terminals Y and Z and yet other multiple power sources 101b may also connect across terminals Y and Z. Circuit interconnections 150a/150b may include various interconnections of groups of direct currents (DC) from power sources 101a/101b that may or may not be coupled to a power devices 103/103a/103b and which any number of also may be connected in various series, parallel, series parallel and parallel series combinations, for example. As such, each of circuit interconnections 150a/150b may include power sources 101a, power sources 101b and bypass units Q9 and/or power devices 103/103a/103b. Where power devices 103a and 103b are similar to power device 103 described by FIG. 1C, power devices 103a and 103b may be used in a utilization to monitor and sense by sensors and/or sensor interfaces 125, use MPPT circuit 138 and bypass unit Q9. The utilization in conjunction with a control algorithm run by controller 105, may provide voltage ($V_{AB}$) and current input ($I_{AB}$) to load 109 at levels which may be predetermined and/or dynamically determined. A feature of power device 103b connected to storage device 111 may be to convert power produced by power sources to be stored in storage device 111 or to convert power stored in storage device 111 to be used by load 109. Alternatively, where load 109 is an AC to DC converter connected to a utility grid, power device 103b may convert power from the utility grid to be stored in storage device 111.

Figure 1O:
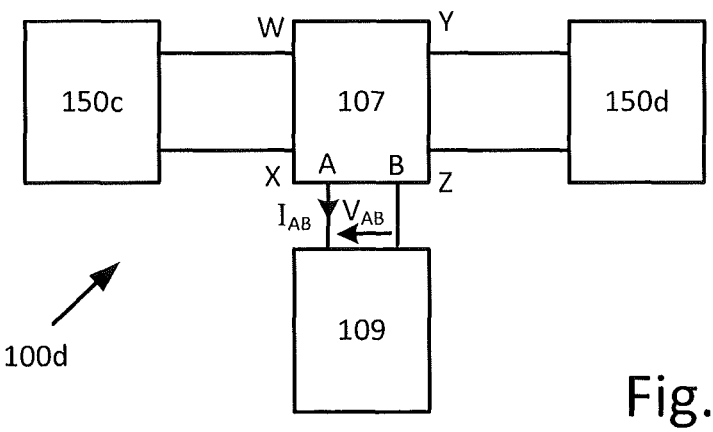
FIG. 1O shows a power system, according to one or more illustrative embodiments.

Reference is now made to FIG. 1O, which shows power system 100d, according to one or more illustrative embodiments. Interconnections 150c and 150d connect at respective inputs of switch unit 107 at terminals W, X and Y, Z. Load 109 connects to the output of switch unit 107 at terminals A and B. The voltage across terminals A and B is $V_{AB}$ and current input to load 109 is $I_{AB}$.

Figure 1P:
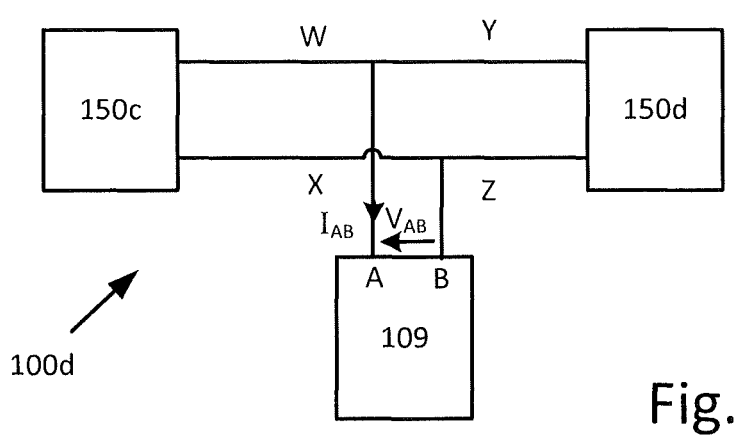
FIG. 1P shows a power system, according to one or more illustrative embodiments.

Reference is now made to FIG. 1P, which shows a power system 100d, when switch SW1 is in first position, according to one or more illustrative embodiments. Switch SW1 in first position connects the outputs of interconnections 150c and 150d in parallel. Load 109 connects to the parallel connection of the outputs of interconnections 150c and 150d.

Figure 1Q:
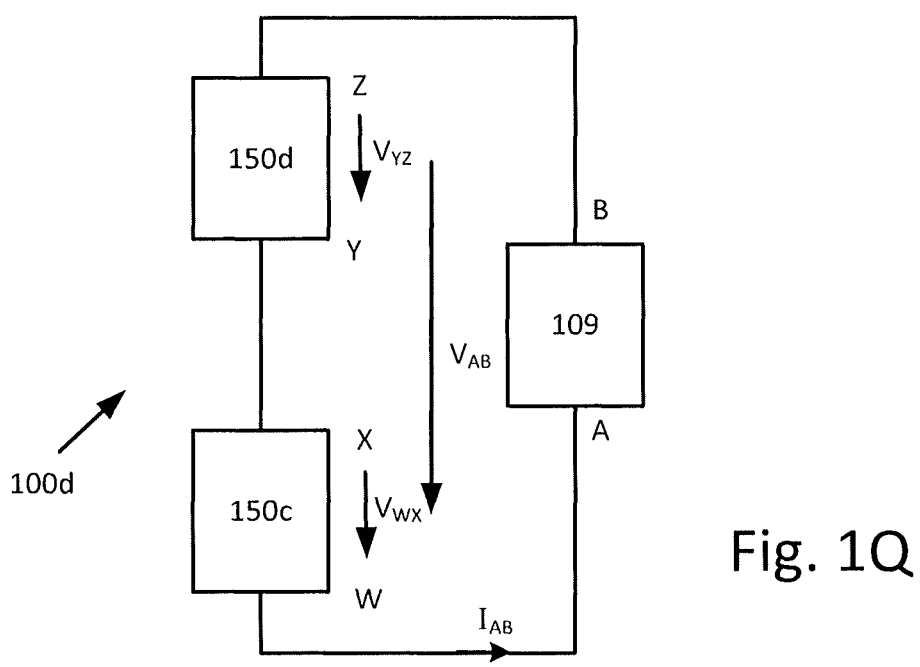
FIG. 1Q shows a power system, according to one or more illustrative embodiments.

Reference is now made to FIG. 1Q, which shows a power system 100d, when switch SW1 is in second position, according to one or more illustrative embodiments. Switch SW1 in second position connects the outputs of interconnections 150c and 150d in series. Load 109 connects across the series connection of the outputs of interconnections 150c and 150d.

Figure 1R:
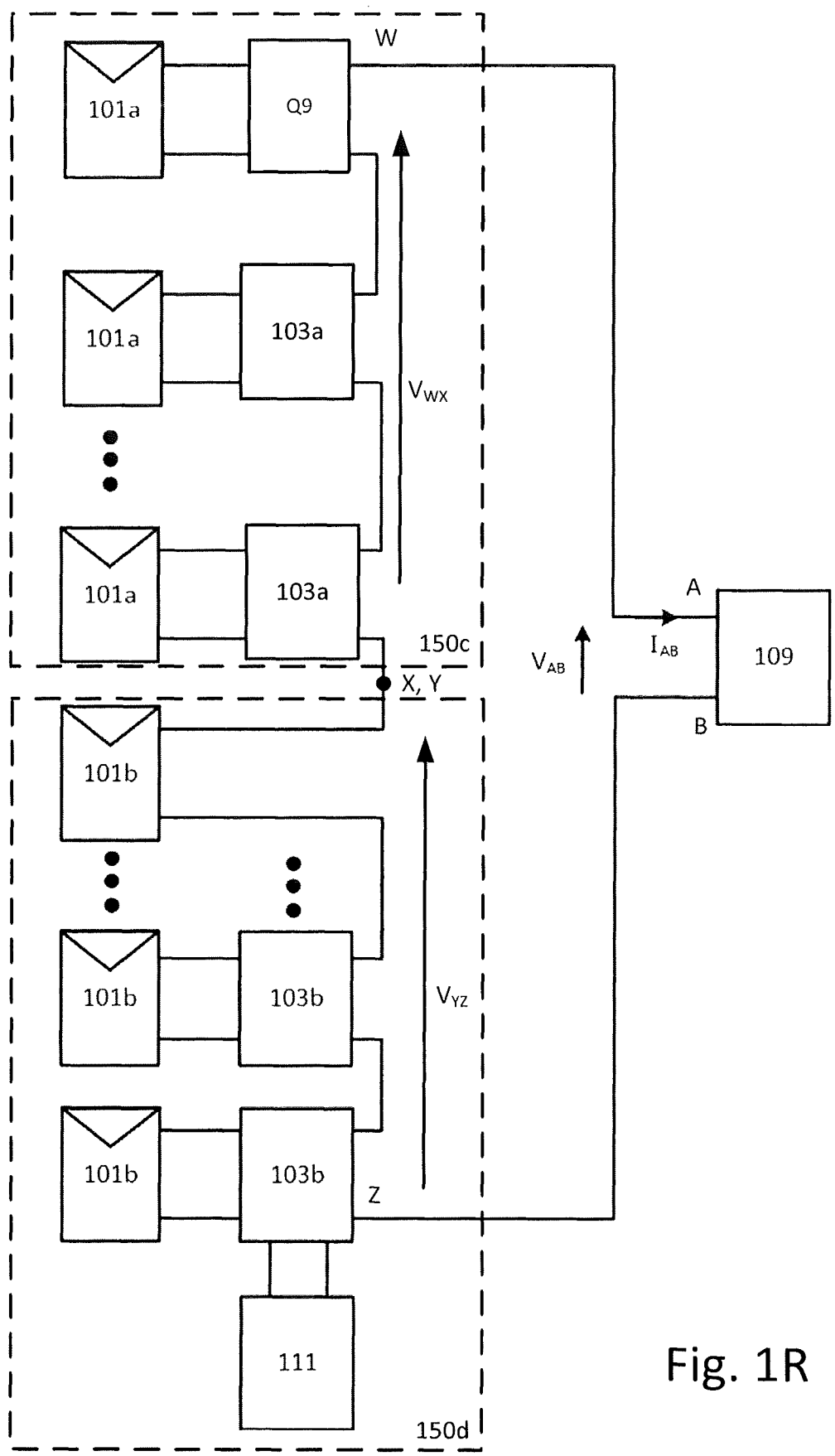
FIG. 1R shows more details of a power system, according to one or more illustrative embodiments.

Reference is now made to FIG. 1R, which shows more details of power system 100d, according to one or more illustrative embodiments. The circuit of FIG. 1R may result from operating switch unit 107, shown as in FIG. 1F, when switch SW1 in the second position. Switch SW1 in the second position may connect terminals W, X in series with terminals Y, Z. The circuit of FIG. 1R further contains, in circuit interconnection 150c, multiple power sources 101a connected to the inputs of power devices 103a, where the outputs of power devices 103a are connected in series together between terminals W and X. Alternatively, another power source 101a connects to the input of bypass unit Q9 which has an output which may be connected in series with the outputs of power devices 103a between terminals W and X. Bypass unit Q9 may be used to bypass a power source 101a and/or the output of a power device 103a. Power device 103a may additionally include a bypass function. Power device 103a may be similar to power device 103 shown in FIG. 1C, power device 103a may be used to monitor and sense by sensors and/or sensor interfaces 125, and use MPPT circuit 138 and bypass unit Q9. The utilization in conjunction with a control algorithm run by controller 105, may provide voltage ($V_{AB}$) and current input ($I_{AB}$) to load 109 at levels that may be predetermined and/or dynamically determined.

Similarly, circuit interconnection 150d may include multiple power sources 101b connected to the inputs of power devices 103b, where the outputs of power devices 103b are connected in series together between terminals Y and Z and yet other multiple power sources 101b may also connect in series between terminals Y and Z. Circuit interconnections 150c/150d may include various interconnections of groups of direct currents (DC) from power sources 101a/101b that may or may not be coupled to a power devices 103/103a/103b and any number of which may also be connected in various series, parallel, series parallel and parallel series combinations, for example. As such, each of circuit interconnections 150c/150d may include power sources 101a, power sources 101b and bypass units Q9 and/or power devices 103/103a/103b. Where power devices 103a and 103b are similar to power device 103 shown in FIG. 1C, power devices 103a and 103b may be used to monitor and sense by sensors and/or sensor interfaces 125, and use MPPT circuit 138 and bypass unit Q9. The utilization in conjunction with a control algorithm run by controller 105, may provide voltage ($V_{AB}$) and current input ($I_{AB}$) to load 109 at levels that may be predetermined and/or dynamically determined. A feature of power device 103b connected to storage may be to convert power produced by power sources to be stored in storage device 111 or to convert power stored in storage device 111 to be used by load 109. Alternatively, where load 109 is an AC to DC converter connected to a utility grid, power device 103b may convert power from the utility grid to be stored in storage device 111.

Reference is now FIG. 1S, which shows a summary of the above described power systems 100a/100b, according to one or more illustrative embodiments. FIG. 1S shows two circuit interconnections 150 connected to two inputs of switch unit 107 at respective terminals W, X and Y, Z. The output of switch unit 107 at terminals A and B may provide voltage ($V_{AB}$) and current input ($I_{AB}$) to load 109 at levels that may be predetermined and/or dynamically determined according to the illustrative methods below. Circuit interconnections 150 have been shown that include serial connections between power device 103a/103b outputs, bypass units Q9 and power sources 101a/101b as shown by interconnections 150c and 150d. Circuit interconnections 150 have been shown that include parallel connections between power device 103a/103b outputs, bypass units Q9 and power sources 101a/101b as shown by interconnections 150a and 150b. Switch unit 107 includes first and second positions of switch SW1. Switch SW1 may also include a third position. The first position may connect terminals W, X in parallel with terminals Y, Z and the second position connects terminals W, X in series with terminals Y, Z. The third position of switch SW1 may be a safety or a startup mode that may isolate circuit interconnections 150 from load 109 so that load 109 does not receive voltage ($V_{AB}$) and current input ($I_{AB}$) at terminals A and B. Consequently, in the design and subsequent operation of power systems as described above, switch unit 107 enables series and parallel connections of various choices available for interconnections 150 while voltage ($V_{AB}$) and current input ($I_{AB}$) to load 109 may be provided at levels that may be predetermined and/or dynamically determined.

Reference is now FIGS. 1T and 1U, which shows further features to switch unit 107 of the summary shown by FIG. 1S, according to one or more illustrative embodiments. FIGS. 1T and 1U show two ways to bypass one bypass interconnection 150 between two serially connected interconnections 150 connected to two inputs of switch unit 107 at respective terminals W, X and Y, Z. FIG. 1T shows a short circuit of a bypass interconnection 150 with bypass link 166 between terminals W, Y. FIG. 1U shows an open circuit between terminals Y, X and bypass link 166 applied between terminals W, X across interconnection 150. Both the open and the short circuits may be provided from switch unit 107 and/or from bypass units 109 which may be included in interconnections 150.

Figure 2:
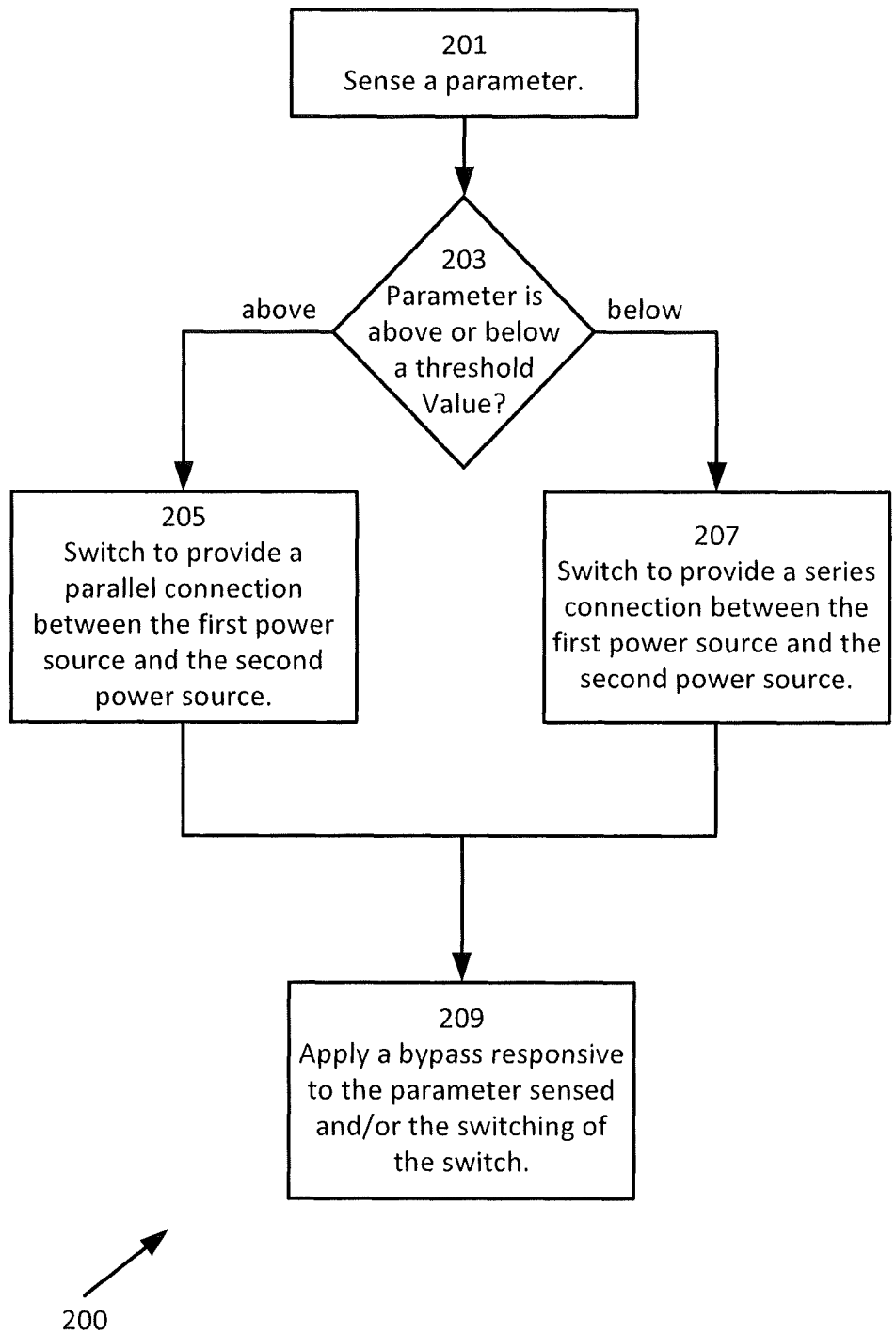
FIG. 2 is a flow chart illustrating a method for operating a switching unit, according to one or more illustrative embodiments.

Reference is now made to FIG. 2, which shows a method 200, according to one or more illustrative embodiments. In the descriptions that follow, various scenarios consider switch SW1 that may be used in the first, second and third positions. The circuit formed as a result of switch SW1 being in first position is shown by FIG. 1H, connects power device 103a in parallel with power device 103b and provides an output on switch unit 107 at terminals A and B. The second position connects power device 103a in series with power device 103b (shown in FIG. 1J) and the third position which may disconnect both power device 103a and 103b from the output at terminals A and B.

At step 201, a parameter of the connection of switch SW1 may be sensed or measured using sensors/sensor interfaces 125 at terminals A and B. The parameter may be power, voltage or current or resistance. The parameter sensed may additionally include and/or consider the present level of solar irradiance, state of charge (SOC) of storage device 111, temperature, wind speed, and present load demand, for example.

In the descriptions that follow, it is assumed that power system 100b is a power system that includes photovoltaic panels for power sources 101a/101b. The descriptions include, by way of non-limiting example, consideration of load 109 being DC to AC inverter with an output connected to a load such as a utility grid for example. The descriptions that also follow considers various operating conditions of a power system such as its operation at dawn, daytime operation, operation at dusk, and the input demand of load 109.

At decision step 203, responsive to the parameter sensed in step 201 may cause switch SW1 if in the second position to switch to the first position or the third position or if switch SW1 is in the first position to switch to the second position or the third position. Switching to the third position from either the first or the second position may be in a situation where an over-voltage or over-current situation takes place or when the power system is in dawn or dusk operation, for example.

In general, power device 103a connected in parallel with power device 103b may provide more current ($I_{AB}$) compared to power device 103a connected in series with power device 103b. Whereas power device 103a connected in series with power device 103b may provide more voltage ($V_{AB}$) compared to power device 103a connected in parallel with power device 103b. In general, a solar panel when exposed to a low-level of irradiance might not provide substantial current, which may cause an increased voltage output level compared to a lower voltage output level when more fully irradiated. Load balancing between interconnections 150a/150b/150c/150d connected in parallel may establish voltage ($V_{AB}$) and current ($I_{AB}$) at thresholds for safe and/or efficient operating levels to load 109. MPPT circuit 138 of power devices 130a/103b used in interconnections 150a/150b/150c/150d may implement algorithms to extract increased power (e.g. by MPPT and/or impedance matching) from power sources 101a/101b, where the parameter sensed in step 201 may include voltage, current, and/or impedance.

Operation of power system 100b, for example, may demand a lower input voltage ($V_{AB}$) threshold to load 109 and may be an increased current demand ($I_{AB}$). The parameter sensed in step 201 may therefore at decision step 203, cause switch SW1 to switch from third position to first position so that power device 103a is connected in parallel with power device 103b at step 205. Further adjustment of current ($I_{AB}$) responsive to the parameter sensed in step 201 and/or responsive to switch SW1 switching from third position to first position in step 205 may be by use of bypass unit Q9 at step 209 to disconnect a power source 101a/101b from connecting at respective terminals W, X and Y, Z). Further adjustment of current ($I_{AB}$) and/or voltage ($V_{AB}$) may be by virtue of power devices 103a/103b outputs connected in parallel that may provide the electrical equivalent of a parallel connection of constant current generators according to Norton's theorem. As such, according to Norton's theorem power device 103a current output may be in a direction that opposes the direction of current output of power device 103b. Since terminals W, X are connected in parallel with terminals Y, Z and given that the directions of current flows $I_{WX}$ and $I_{YZ}$ are adjustable, current $I_{AB}$ to load is according to Kirchoff's current law may be the algebraic sum of $I_{WX}$ and $I_{YZ}$.

$$I_{AB}=I_{WX}+I_{YZ}$$

Operation of power system 100b, for example, may demand a higher input voltage threshold to load 109 and may be a decreased current demand ($I_{AB}$). The parameter sensed in step 201 may therefore at decision step 203, cause switch SW1 to switch from third position to second position so that power device 103a is connected in series with power device 103b (shown in FIG. 1J) at step 207. Power device 103a connected in series with power device 103b at step 207 increases voltage ($V_{AB}$) applied to load 109.

Further adjustment of voltage ($V_{AB}$) and/or current ($I_{AB}$) responsive to the parameter sensed in step 201 and/or responsive to switch SW1 switching from third position to second position in step 207 considers power device 103a connected in series with power device 103b. As such, according to Kirchoff's current law:

$$I_{AB}=I_{WX}=I_{YZ}$$

Further adjustment of voltage ($V_{AB}$) and/or current ($I_{AB}$) may be by use of bypass unit Q9 at step 209 to disconnect a power source 101a/101b from connecting at respective terminals W, X and Y, Z) for example, or control of power devices 103a/103b based on power device 103a connected in series with power device 103b.

Reference is now made again to FIG. 2, which shows a method 200 according to one or more illustrative embodiments. The circuit formed as a result of switch SW1 being in first position is shown by FIG. 1N that connects interconnection 150a in parallel with interconnection 150b and provides an output on switch unit 107 at terminals A and B. The second position connects interconnection 150a in series with interconnection 150b (shown in FIG. 1M) and the third position that may disconnect both interconnections 150a and 150b from the output at terminals A and B.

At step 201, a parameter of the connection of switch SW1 may be sensed or measured using sensors/sensor interfaces 125 at terminals A and B and/or at various points in interconnections 150a and 150b by use of sensors/sensor interfaces 125 that may be included in power devices 103a and 103b. The parameter may be power, voltage, current, or resistance. The parameter sensed may additionally include and/or consider the present level of solar irradiance, state of charge (SOC) of storage device 111, temperature, wind speed, and present load demand, for example.

At decision step 203, responsive to the parameter sensed in step 201 may cause switch SW1 if in the second position to switch to the first position or the third position or if switch SW1 is in the first position to switch to the second position or the third position.

Operation of power system 100c, for example, may demand a lower input voltage ($V_{AB}$) threshold to load 109 and may be an increased current demand ($I_{AB}$). The parameter sensed in step 201 may therefore at decision step 203, cause switch SW1 to switch from third position to first position so that interconnection 150a is connected in parallel with interconnection 150b at step 205. Further adjustment of current ($I_{AB}$) responsive to the parameter sensed in step 201 and/or responsive to switch SW1 switching from third position to first position in step 205 may be by use of bypass unit Q9 at step 209 to disconnect a power source 101a/101b from connecting at respective terminals W, X and Y, Z). Further adjustment of current ($I_{AB}$) and/or voltage ($V_{AB}$) may be by virtue of power devices 103a/103b outputs connected in parallel that may provide the electrical equivalent of a parallel connection of constant current generators according to Norton's theorem. As such, according to Norton's theorem, one or more power device 103a current outputs may be in a direction that opposes the direction of current output of the other power devices 103a in interconnection 150a to give current $I_{WX}$. Similarly, in interconnection 150b one or more power device 103b current outputs may be in a direction that opposes the direction of current output of the other power devices 103b to give current $I_{YZ}$. Further, since terminals W, X are connected in parallel with terminals Y, Z and given that the directions of current flows $I_{WX}$ and $I_{YZ}$ are adjustable, current $I_{AB}$ to load is according to Kirchoff's current law the algebraic sum of $I_{WX}$ and $I_{YZ}$.

$$I_{AB}=I_{WX}+I_{YZ}$$

Operation of power system 100c, for example, may demand a higher input voltage threshold to load 109 and decreased current demand ($I_{AB}$). The parameter sensed in step 201 may therefore at decision step 203, cause switch SW1 to switch from third position to second position so that interconnection 150a is connected in series with interconnection 150b at step 207. Interconnection 150a connected in series with interconnection 150b at step 207 increases voltage ($V_{AB}$) applied to load 109.

Further adjustment of voltage ($V_{AB}$) and/or current ($I_{AB}$) responsive to the parameter sensed in step 201 and/or responsive to switch SW1 switching from third position to second position in step 207 considers interconnection 150a connected in series with interconnection 150b. As such, according to Kirchhoff's current law:

$$I_{AB}=I_{WX}=I_{YZ}$$

Further adjustment of voltage ($V_{AB}$) and/or current ($I_{AB}$) may be by use of bypass unit Q9 at step 209 to disconnect a power source 101a/101b from connecting at respective terminals W. X and Y. Z), for example, or control of power devices 103a/103b based on interconnection 150a connected in series with interconnection 150b.

Reference is now made again to FIG. 2, which shows a method 200 according to one or more illustrative embodiments. The circuit formed as a result of switch SW1 being in first position is shown by FIG. 1R that connects interconnection 150c in series with interconnection 150d and provides an output on switch unit 107 at terminals A and B. The second position connects interconnection 150c in parallel with interconnection 150d (shown in FIG. 1P) and the third position which may disconnect both interconnections 150c and 150d from the output at terminals A and B.

At step 201, a parameter of the connection of switch SW1 may be sensed or measured using sensors/sensor interfaces 125 at terminals A and B and/or at various points in interconnections 150c and 150d by use of sensors/sensor interfaces 125 which may be included in power devices 103a and 103b. The parameter may be power, voltage, current, or resistance. The parameter sensed may additionally include and/or consider the present level of solar irradiance, state of charge (SOC) of storage device 111, temperature, wind speed, and present load demand, for example.

At decision step 203, responsive to the parameter sensed in step 201 may cause switch SW1 if in the second position to switch to the first position or the third position or if switch SW1 is in the first position to switch to the second position or the third position.

Operation of power system 100d, for example, may demand a lower input voltage ($V_{AB}$) threshold to load 109 and may increase current demand ($I_{AB}$). The parameter sensed in step 201 may therefore at decision step 203, cause switch SW1 to switch from third position to first position so that interconnection 150c is connected in parallel with interconnection 150d at step 205. Further adjustment of current ($I_{AB}$) responsive to the parameter sensed in step 201 and/or responsive to switch SW1 switching from third position to first position in step 205 may be by, for example, if all power sources 101a/101b are connected to the input of power device 103a/103b and the outputs of power devices 103a/103b are connected in series. A suitable algorithm running on controller 105 may ensure load balancing between interconnection 150c connected in parallel with interconnection 150d. Load balancing between interconnection 150c connected in parallel with interconnection 150d may then establish voltage ($V_{AB}$) and current ($I_{AB}$) at threshold for safe and/or efficient operating levels to load 109. MPPT circuit 138 of power devices 130a/103b may implement algorithms to extract increased power from power sources where the parameter sensed in step 201 may include voltage, current, and/or impedance. Included in the suitable algorithm may allow the adjustment of voltages $V_{WX}$ of interconnection 150c and/or voltage $V_{YZ}$ of interconnection 150d.

Operation of power system 100d, for example, may demand a higher input voltage threshold to load 109 and may decrease current demand ($I_{AB}$). The parameter sensed in step 201 may therefore at decision step 203, cause switch SW1 to switch from third position to second position so that interconnection 150c is connected in series with interconnection 150d at step 207. Interconnection 150c connected in series with interconnection 150d at step 207 may therefore increase voltage ($V_{AB}$) applied to load 109. Further adjustment of voltage ($V_{AB}$) and/or current ($I_{AB}$) responsive to the parameter sensed in step 201 and/or responsive to switch SW1 switching from third position to second position in step 207 considers interconnection 150c connected in series with interconnection 150d. As such, according to Kirchhoff's voltage law:

$$V_{AB}=V_{WX}+V_{YZ}$$

Adjustment of voltages $V_{WX}$ and/or voltage $V_{YZ}$ may include using bypass units Q9 (step 209) to provide a short circuit bypass thereby reducing $V_{WX}$ and/or voltage $V_{YZ}$. Alternatively, the control of power devices 130a/103b may be such that their outputs may provide a voltage which adds to $V_{WX}$ and/or voltage $V_{YZ}$. Alternatively, the voltage may be reversed in polarity with respect to $V_{WX}$ and/or voltage $V_{YZ}$ so that the voltage may subtract from $V_{WX}$ and/or voltage $V_{YZ}$. As such, voltage ($V_{AB}$) applied to load 109 at terminals A and B for the efficient operation of load and/or to enable predefined safe operating levels of input power to load 109.

Figure 3A:
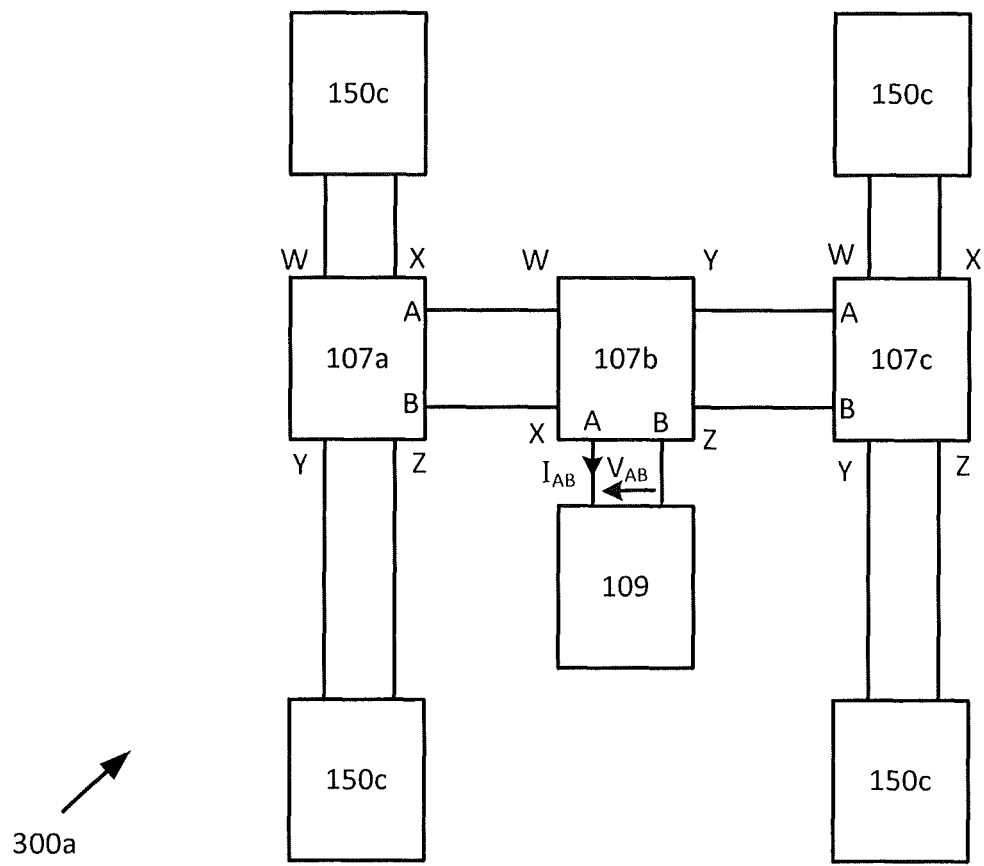
FIG. 3A shows a power system, according to one or more illustrative embodiments

Reference is now to FIG. 3A, which shows a power system 300a, according to one or more illustrative embodiments. Two interconnections 150c connect into respective inputs of switch unit 107a at terminals W, X and Y, Z. Similarly, another two interconnections 150c connect into respective inputs of switch unit 107c at terminals W, X and Y, Z. The outputs of switch units 107a and 107c at terminals A and B connect respectively to respective inputs of switch unit 107b at terminals W, X and Y, Z. A load 109 connects to the output of switch unit 107b at terminals A and B. Details of interconnection 150c are described above with respect to FIG. 1R.

Figure 3B:
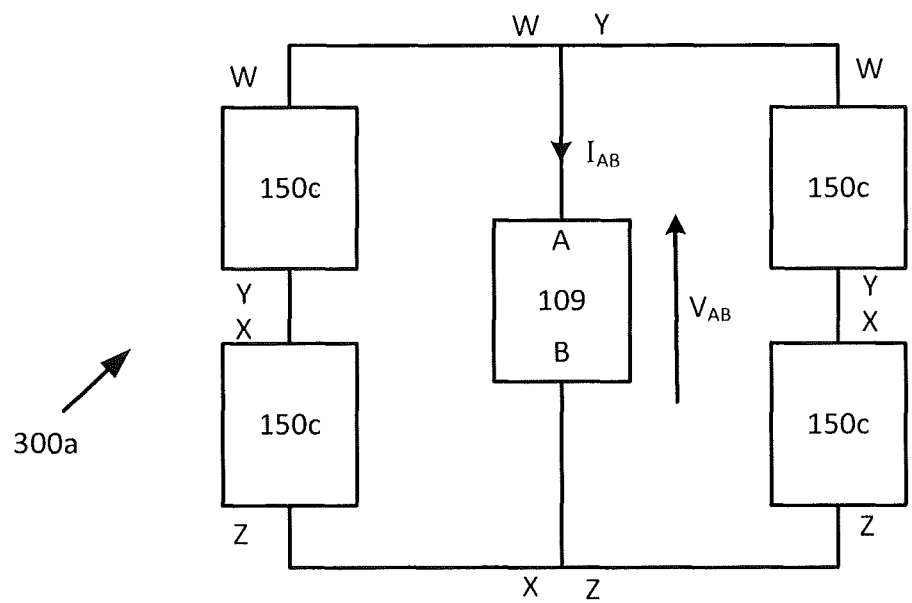
FIG. 3B shows a power system, according to one or more illustrative embodiments.

Reference is now to FIG. 3B, which shows a circuit of power system 300a, according to one or more illustrative embodiments. As a result of switch SW1 in the second position in switch units 107a and 107c, interconnections 150c are connected in series. As a result of switch SW1 being in the first position in switch unit 107b, the two series interconnections 150c are connected in parallel across the input of load 109 at terminals A and B.

Figure 3C:
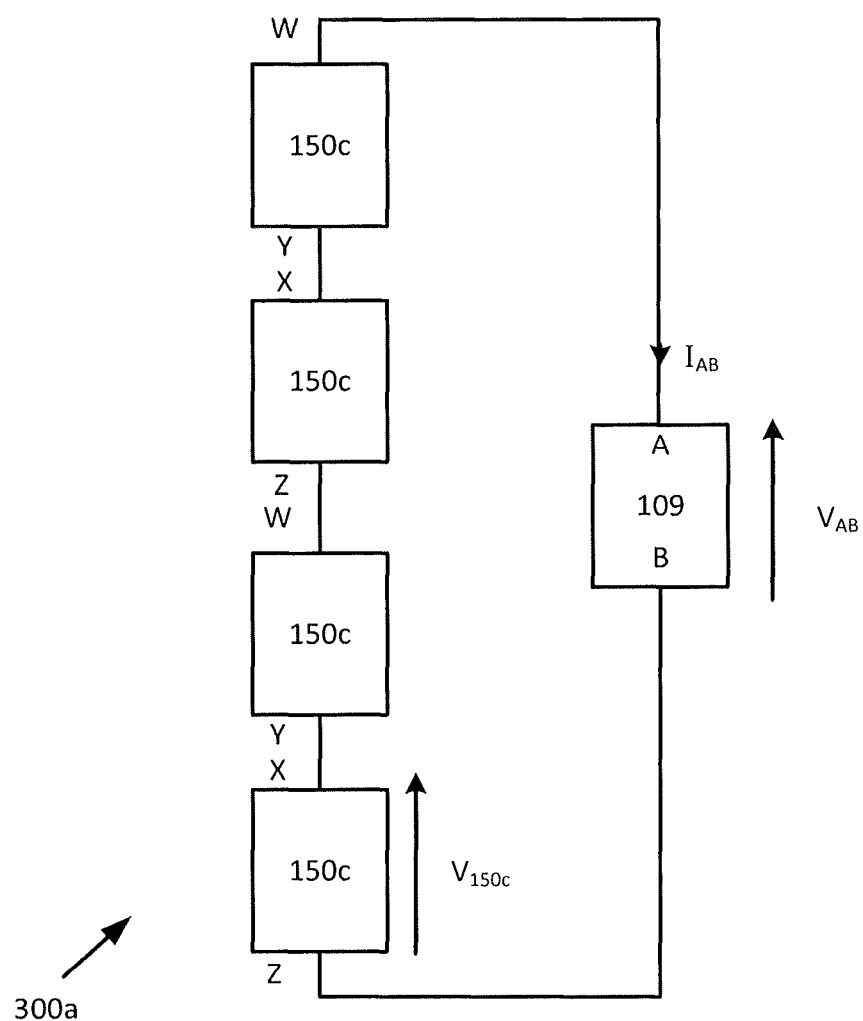
FIG. 3C shows a power system, according to one or more illustrative embodiments.

Reference is now to FIG. 3C, which shows a circuit of power system 300a, according to one or more illustrative embodiments. As a result of switch SW1 in the second position in switch units 107a and 107c, interconnections 150c are connected in series. As a result of switch SW1 being also in the second position in switch unit 107b, the two series interconnections 150c are connected in series across the input of load 109 at terminals A and B. The voltage across the input of load 109 at terminals A and B is $V_{AB}$ which is the sum of voltages ($V_{150c}$) from each inter connection 150c.

From the above description with respect to FIGS. 3B and 3C, various permutations exist for the combined switch positions of each switch SW1 in switch units 107a, 107b and 107c. For example, interconnections 150c may all be wired in parallel with load 109 or two pairs interconnections 150c may be in parallel and each pair connected in series across load 109. Moreover, other interconnections 150 as described above may be used in power system 300a and other power systems for a design of a power system and subsequent use of the power system. Power system as described herein may include multiple inter connected power sources such as photovoltaic generators, batteries, generators, and wind turbines. The design of the power system and subsequent operation of the power system, may allow for a dynamic configuration of the power system according to description described herein.

Figure 4:
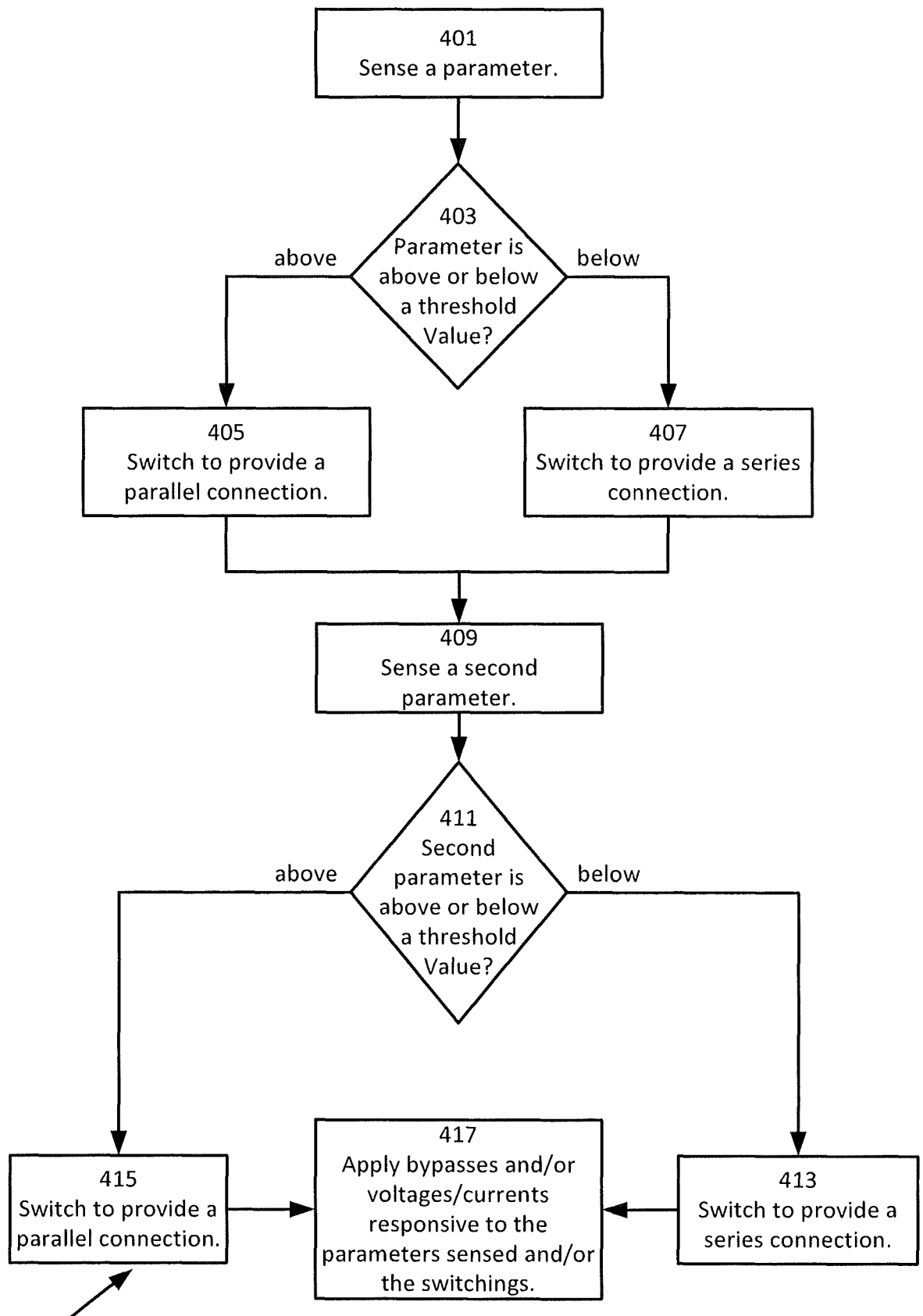
FIG. 4 shows a method which may be applied to a power system such as the ones shown in FIGS. 3B and 3C, according to one or more illustrative embodiments.

Reference is now made to FIG. 4, which shows method 400 which may be applied to power system 300a to give the circuits shown in FIGS. 3B and 3C for possible switch combinations for switch SW1 in switch units 107a, 107b and 107c, according to one or more illustrative embodiments. The switch combination for switch SW1 in each switch units 107a. 107b and 107c may be used in the first, second or third positions. The first position connects terminals W, X in parallel with terminals Y. Z. The second position connects terminals W, X in series with terminals Y. Z. The third position may be a safety, an isolation or a startup mode which may be used by switch 107b for example which may isolate some and/or all circuit interconnections 150c from load 109 so that load 109 does not receive voltage ($V_{AB}$) and current input ($I_{AB}$) at terminals A and B.

At step 401, a parameter of the connection of switches SW1 may be sensed or measured using sensors/sensor interfaces 125 at terminals A and B and/or at various points in each of the four interconnections 150c by use of sensors/sensor interfaces 125 which may be included in power devices 103a and 103b. The parameter may be power, voltage, coulombic charge, current or impedance. The parameters sensed may additionally include and/or consider the present level of solar irradiance, state of charge (SOC) of storage device 111 (if connected to power device 103b), temperature, wind speed and present load demand for example.

The parameter sensed in step 401 may include a measurement of a voltage of each inter connection 150. The measurement of the voltage of each interconnection 150c may be by the application of bypass link 166 as shown in FIGS. 1T and 1U. The measurement of the voltage of each interconnection 150c may be by for example by allowing an interconnection 150c, a series connection of interconnections 150c or a parallel connection of interconnections 150c to be connected across load 109 via switch units 107a and 107b. The measurement of the voltage of each interconnection 150c may be by for example by not allowing an interconnection 150c, a series connection of interconnections 150c or a parallel connection of interconnections 150c to be connected across load 109 via switch units 107a and 107b. During the measurement of the voltage, Switch unit 107c may be utilized to isolate the interconnections 150c which are connected to switch unit 107c at terminals W, X and Y, Z.

At decision step 403, responsive to the parameters sensed in step 401, may cause switches SW1 if in the second position to switch to the first position or the third position or if switch SW1 is in the first position to switch to the second position or the third position. Operation of power system 300a for example may demand a number of input voltage ($V_{AB}$) thresholds to be available to load 109 and/or current demands ($I_{AB}$). The parameter sensed in step 401 may therefore at decision step 403 cause switches SW1 to switch so that adjustment of current ($I_{AB}$) and voltage ($V_{AB}$) is responsive to the parameter sensed in step 401.

If the voltages measured at step 401 are below a threshold level at step 403, a first series connection of two interconnections 150c by use of switch unit 107a and a second series connection of two interconnections 150c by use of switch unit 107c may be made in step 407. However, if the voltages are above a threshold level at step 403, a first parallel connection of two interconnections 150c by use of switch unit 107a and a second parallel connection of two interconnections 150c by use of switch unit 107c may be made in step 405. In general, assuming interconnections 150 are the same, a series connection of interconnections 150 doubles voltage but halves current and whereas a parallel connection of interconnections 150 doubles current but halves voltage.

After steps 405 and 407, a second parameter may be sensed at step 409. The second parameter may be sensed for example for when two interconnections 150c are connected in series for example to give the voltage of the two interconnections 150c connected in series. Two interconnections 150c connected in series may be achieved by use of switch units 107a and 107c to provide for example the two interconnections 150c connected in series.

At decision step 411, for when two interconnections 150c are connected in series, if the series voltage is above a voltage threshold, at step 405 switch unit 107b may be used in order to connect the two series interconnections 150c in parallel with another two series interconnections 150c as shown in FIG. 3B. At decision step 411, if the series voltage is below a voltage threshold, at step 413 switch unit 107b may be used in order to connect the two series interconnections 150c with another two interconnections 150c in series as shown in FIG. 3C. Alternatively, if the series voltage is above a voltage threshold, switch unit 107b may be implemented by the application of bypass link 166 as shown in FIGS. 1T and 1U so that an interconnection 150c in the series connection of two interconnections 150c may be bypassed.

After step 415 or 413, further adjustment of current ($I_{AB}$) and voltage ($V_{AB}$) supplied to load 109 responsive to sensing steps 401/409 and/or switching steps 405, 407, 413, 415 may be made by virtue of adjustments within each interconnection 150c in step 417.

According to Kirchhoff's voltage law with respect to FIG. 3C:

$$V_{AB} = \Sigma V_{150c}$$

With respect to FIG. 3C, adjustment of voltages ($V_{150c}$) within each interconnection 150c may include using bypass units Q9 to provide a short circuit bypass of power devices 130a/103b outputs thereby reducing voltage $V_{AB}$ applied to load 109. Alternatively, the control of power devices 130a/103b outputs connected in series in an inter connection 150c may be such that power devices 130a/103b outputs may provide a voltage which adds to the resulting voltage $V_{AB}$ applied to load 109. Alternatively, the voltage may be reversed in polarity with respect to other voltage outputs of each power devices 130a/103b outputs so that the voltage may subtract from voltage $V_{AB}$ applied to load 109.

Other combination of switches SW1 in 107a, 107b and 107c as well as the consideration of other interconnections 150 such as inter connections 150a/150b/150c and 150d may also provide different levels of current ($I_{AB}$) and voltage ($V_{AB}$) across the input of load 109 at terminals A and B which includes embodiments described above. As such, voltage ($V_{AB}$) applied to load 109 at terminals A and B for the efficient operation of load and/or to enable predefined safe operating levels of input power to load 109 may be made by use of switch units 107a/107b/107c described above as well as adjustment of voltages ($V_{150c}$) within each interconnection 150c at step 417 for example.

Figure 5A:
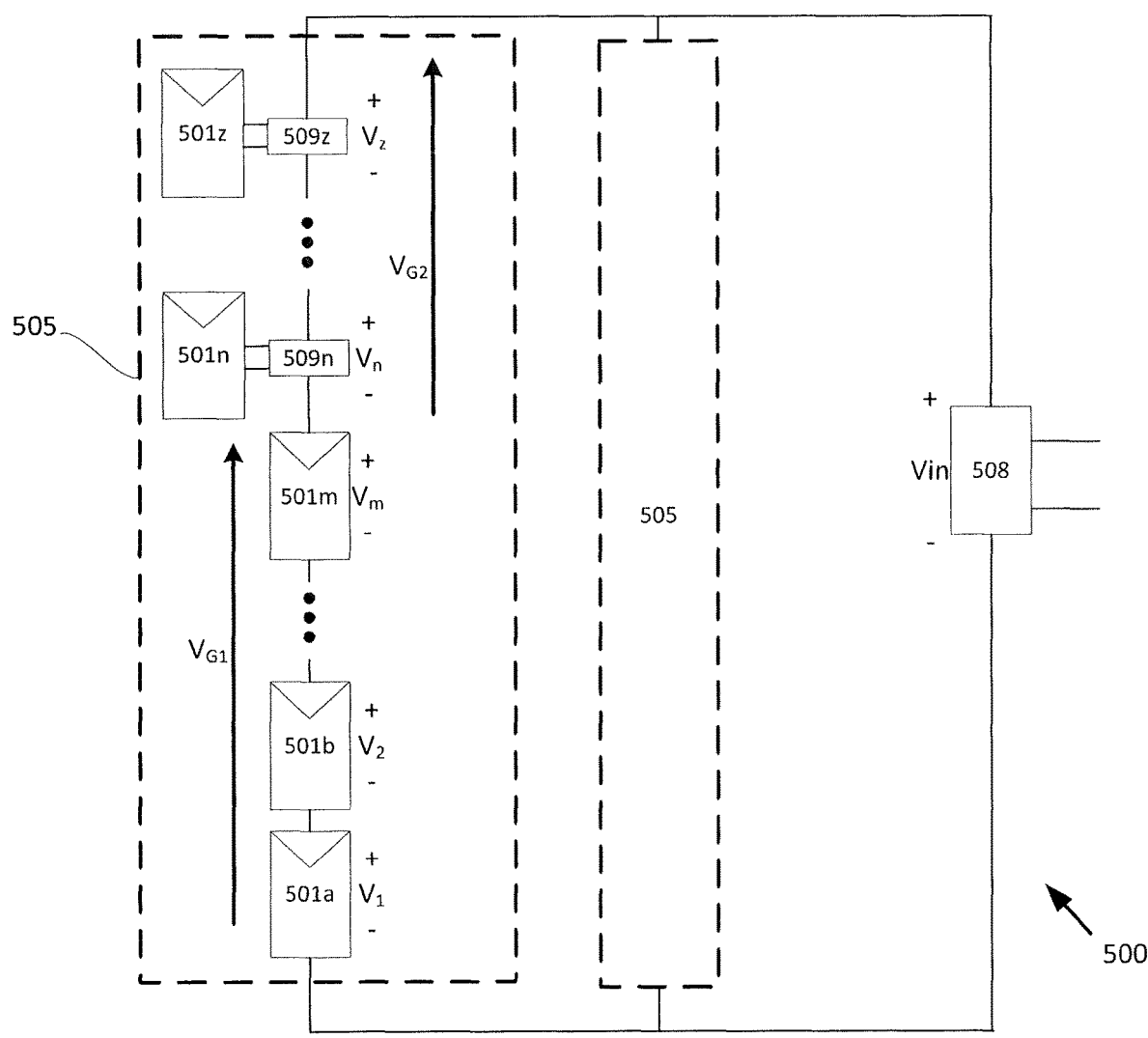
FIG. 5A shows a power system, according to one or more illustrative embodiments.

Reference is now made to FIG. 5A, which illustrates a power system 500 according to illustrative embodiments. Power system 500 may include one or more parallel-connected strings 505. Each string 505 may include a first group of power sources (e.g., photovoltaic generators 501a-501m) directly connected in series, and a second group of power sources (e.g. PV generators 501n-501z) connected via power devices 509 (e.g., 509n-509z). A system power device 508 may be connected in parallel to the one or more strings 505. In some embodiments, system power device 508 may include a DC/AC inverter and may output alternating current (AC) power to a power grid, home or other destinations. In some embodiments, system power device 508 may include a combiner box, transformer and/or safety disconnect circuit. For example, system power device 508 may comprise a DC combiner box for receiving DC power from a plurality of strings 505 and outputting the combined DC power. In some embodiments, system power device 508 may include a fuse coupled to each string 505 for overcurrent protection, and/or one or more disconnect switches for disconnecting one or more strings 505.

System power device 508 may operate in one or more modes. In one mode of operation, system power device 508 may regulate (e.g., control) the input voltage Vin across the one or more strings 505. In a second mode of operation, system power device 508 may operate in a power-control mode and may be configured to draw a certain level of power from the power sources in the power system.

In some embodiments, system power device 508 may include or be coupled to a control device and/or a communication device for controlling or communicating with power devices 509. For example, system power device 508 may comprise a control device such as a microprocessor, Digital Signal Processor (DSP) and/or a Field Programmable Gate Array (FPGA) configured to control the operation of system power device 508. System power device 508 may further comprise a communication device (e.g., a Power Line Communication circuit, an acoustic communication device and/or a wireless communication device) configured to communicate with linked communication devices included in power devices 509.

Each photovoltaic generator 501 may have a maximum voltage under open-circuit conditions (Voc), and as current flowing through the photovoltaic generator 501 increases, the voltage across the PV generator 501 may decrease. Each photovoltaic generator 501 may have a maximum power point (MPP) voltage and current, with the MPP voltage having a value of, for example, about 80% of the Voc value. The first group of power sources may comprise m serially connected PV generators 501a-501m, with m being a positive integer value greater than one selected to prevent the entire voltage of a string 505 from surpassing a maximum allowable string voltage. A second group of power sources may comprise z PV generators 501n-501z, with z being a positive integer value greater than one selected to allow the first group of power sources and the second group of power sources to be connected in series when PV generators 501 are operating at or about at MPP voltages, with power devices 509 disconnecting and/or short circuiting PV generators 501n-501z to prevent the total string voltage from rising above a maximum allowable limit under other (non-MPP) operating conditions.

For example, a PV generator 501 may have an open circuit voltage of 40V, a maximum power point voltage of 32V, and a string 505 may have a maximum allowable voltage of 1500V. The first group of power sources may comprise m=37 PV generators 501, resulting in an open-circuit voltage across the first group $V_{G1}$=37·40=1480V. When the first group of power sources is operating under open circuit conditions, power devices 509n-509z may be operated to keep the voltage across the second group of power sources, $V_{G2}$, under 20V, to keep the entire string 505 voltage under 1500V. The second group of power sources may comprise z=9 PV generators, resulting in a maximum power-point string voltage of (37+9)·32=1472V, which is also under the maximum allowable total string voltage.

Designing a power system similarly to as shown with regard to power system 500 may result, according to certain features of embodiments disclosed herein, in an increased power yield from the PV systems, and increased return on investment (ROI) when constructing a PV system. For example, without utilization of power devices 509, a string 505 may be limited to have 37 PV generators 501, to avoid surpassing a maximum allowable open-circuit string voltage. By disposing and operating power device 509 in accordance with illustrative embodiments, a string 505 may be adapted to have 46 PV generators 501, which may result in an increase of about %24 in energy yield under MPP operating conditions. Details for structure and operation of power devices 509 according to illustrative embodiments are discussed below with regard to FIGS. 5B-5F.

Figure 5B:
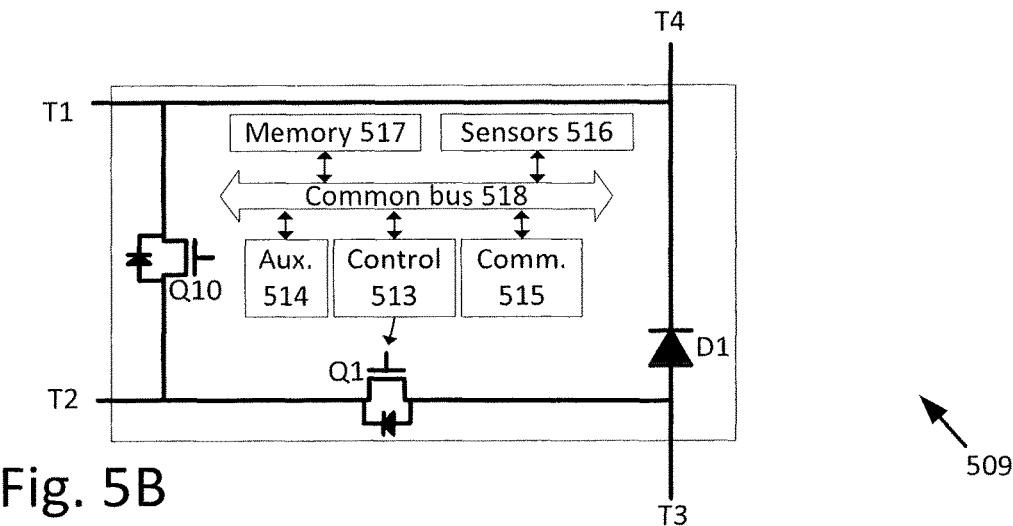
FIG. 5B shows a power device, according to one or more illustrative embodiments.

Reference is now made to FIG. 5B, which shows a power device 509 according to illustrative embodiments. Power device 509 may comprise terminals T1, T2, T3 and T4. Terminals T1 and T2 may be configured to attach to a power source (e.g., a PV generator 501 of FIG. 5A, or two or more PV generators 501 connected in series or in parallel (not explicitly shown)). Terminals T3 and T4 may be configured to attach to conductors which form part of a string 505. Diode D1 may be disposed between terminals T3 and T4. Switch Q1 (shown as a MOSFET transistor) may be disposed between terminals T3 and T2. In some embodiments, switch Q1 may instead be disposed between terminals T1 and T4. Diode D1 may carry current flowing through a string 505 when a power source connected between terminals T1 and T2 is disconnected (e.g., when switch Q1 is OFF). Diode D1 may be rated to carry a current flowing through string 505, for example, about 10 Amperes.

Power device 509 may comprise controller 513, which may be configured to control a state (e.g., ON and OFF) of switch Q1. Controller 513 may include, for example, an analog control circuit, a microprocessor, a Digital Signal Processor (DSP), and/or a Field Programmable Gate Array (FPGA).

In some embodiments, diode D1 may be replaced or supplemented by a second switch (e.g., a MOSFET or IGBT), which may reduce conduction losses, with the second switch also controlled by controller 513.

In some embodiments, switch Q10 (e.g., a MOSFET or IGBT) may be disposed between terminals T1 and T2. Switch Q10 may be controlled (e.g. by controller 513) to be in the ON state, to short a power source connected between terminals T1 and T2, in addition to or instead of controlling switch Q1 to disconnect the power source from terminal T3.

In some embodiments, power device 509 may have multiple inputs (e.g., terminals for receiving power from two, three, ten or more power sources) and may be configured to internally connect or disconnect the two, ten or more power sources from a string according to a photovoltaic string according to the string voltage (e.g. $V_{Q1}$ of FIG. 5A).

Power device 509 may further comprise auxiliary power circuit 514, which may be configured to receive power (e.g., from a power source connected between terminals T1 and T2) and provide operational power for other components of power device 509, for example, controller 513, communication device 515, sensors/sensor interfaces 516, memory device 517, etc.

Communication device 515 may be configured to communicate with a system power device 508 and/or similar communication devices 515 included in other power devices 509. Communication device 515 may include, for example, a wired communication device (e.g., communicating using Power Line Communications or over a dedicated communication bus such as RS-422), a wireless communication device (e.g. a cellular modem, BLUETOOTH™, ZIGBEE™ or Wi-Fi device) and/or an acoustic communication device. Memory device 517 (e.g., flash. ROM. RAM, or other typed of memory) may be used to store code and/or data such as parameter measurements and/or metadata related thereto.

Sensors/sensor interfaces 516 may be configured to measure one or more parameters at or around power device 509. For example, sensors/sensor interfaces 516 may measure or receive measurements of voltage and/or current between terminals T1 and T2, voltage and/or current between terminals T3 and T4, temperature at or around electrical components of power device 509, solar irradiance, and/or wind strength. For example, when a PV generator is connected between terminals T1 and T2, input and voltage measurements taken between terminals T1 and T2 may provide an indication of the power produced by the PV generator, and solar irradiance measurements, may provide an indication of an I-V curve characterizing the PV generator. As another example, when a wind turbine is connected between terminals T1 and T2, input and voltage measurements taken between terminals T1 and T2 may provide an indication of the power produced by the wind turbine, and wind measurements, may provide an indication of a power curve characterizing the PV wind turbine.

Common bus 518 may be provided to interconnect one or more devices included in power device 509 (e.g., controller 513, communication device 515, sensors/sensor interfaces 516, etc.). In some embodiments, certain devices may be communicatively interconnected but not connected to all devices.

Controller 513 may be configured to operate power device 509 in multiple modes. A power source may be connected between terminals T1 and T2. In a first mode, power device 509 may disconnect the power source from terminals T3 and T4, for example, by controller 513 keeping switch Q1 in the OFF position. In a second mode, power device 509 may connect the power source to terminals T3 and T4, for example, by controller 513 keeping switch Q1 in the ON state. In some embodiments, in a third mode, controller 513 may operate switch Q1 at a high switching frequency (e.g., 100 Hz, 1 kHz, 10 kHz, 100 kHz. 1 MHz) to provide an average DC voltage between terminals T3 and T4 which is proportional to the duty cycle of switch Q1. For example, if a power source connected between terminals T1 and T2 has a voltage of 50V, switching switch Q1 at a duty cycle of %10 may generate an average DC voltage of 5V between terminals T3 and T4. In some embodiments, power device 509 may further include a filter (e.g., a capacitor and/or an inductor) to smooth a voltage between T3 and T4 when power device 509 is operating in the third mode. In some embodiments, the third mode might not be implemented.

Figure 5C:
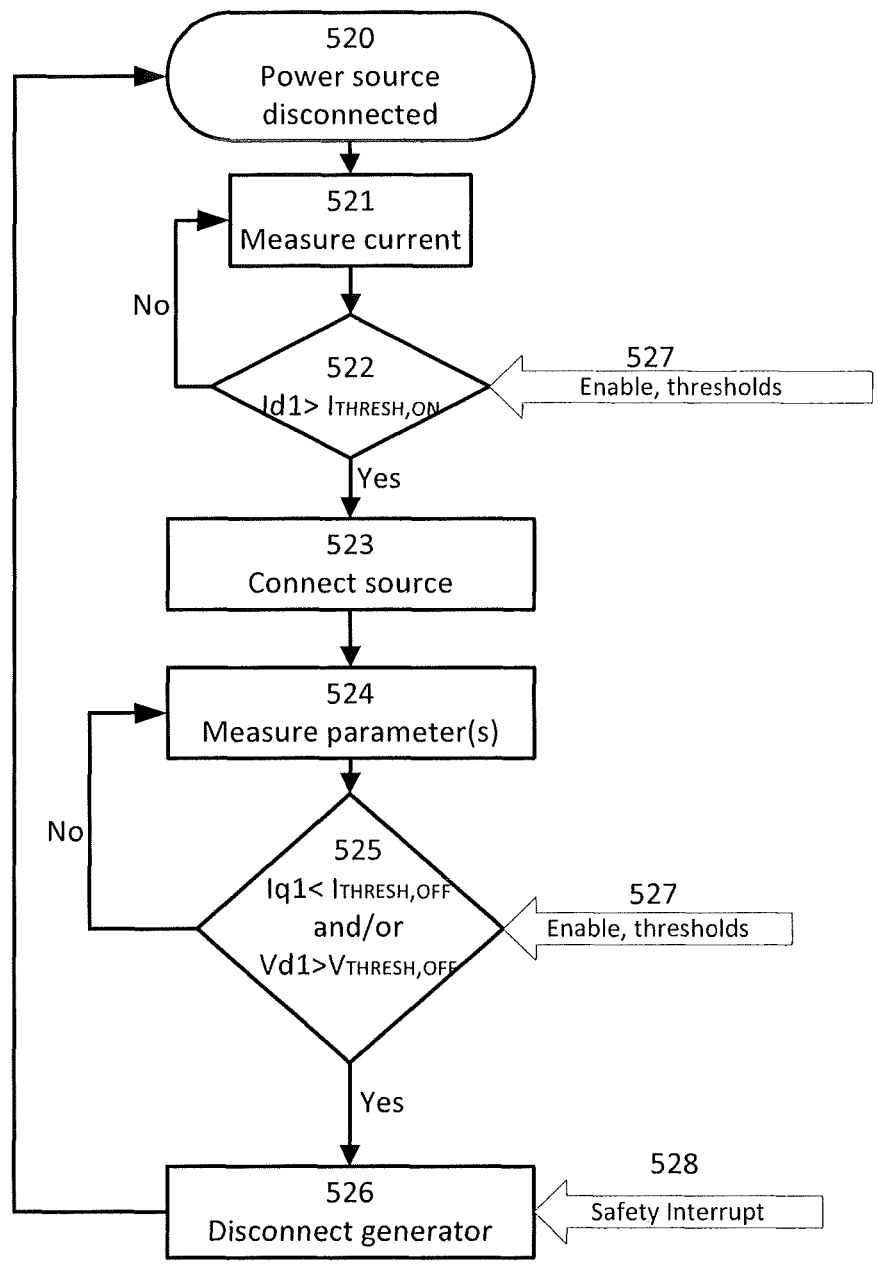
FIG. 5C is a flow chart illustrating a method for operating power devices, according to one or more illustrative embodiments.

Reference is now made to FIG. 5C, which illustrates a method 510 for operating power devices 509 according to illustrative embodiments. Method 510 may be carried out by a controller 513 controlling a power device 509 of FIG. 5B. The power device 509 may be connected to a power source (e.g., a PV generator 501) within a string 505 similarly to as illustrated in FIG. 5A. At initial conditions 520, the power source may be disconnected (i.e., controller 513 may be keeping a corresponding switch Q1 in the OFF position). The power source may be disconnected due to low string current flowing through diode D1, which may be indicative of a high voltage across serially connected power sources (e.g., PV generators 501a-501m of FIG. 5A), for example during system start-up (e.g., the early morning hours). At step 521, power device 509 may measure (e.g., via sensors/sensor interfaces 516 providing a measurement to controller 513) an electrical parameter, for example, a current flowing through diode D1 ($I_D$). At step 522, the measured parameter may be compared to a threshold. For example, $I_{D1}$ may be compared to a current threshold. The threshold may be set statically (e.g., fixing Ithresh,on=7 A) or dynamically (e.g., by receiving a threshold via message 527 received, from example, from system power device 508 of FIG. 5A). If the measured parameter is below the threshold, the controller may (perhaps after waiting for a short period of time) return to step 521. If the measured parameter is above the threshold, the controller may, at step 523, connect the power source to the string 505 (e.g., by switching switch Q1 to the ON state). In some embodiments, a message 527 may provide an enable signal which may override the comparison of step 522. For example, message 527 may instruct controller 513 to keep switch Q1 in the OFF state regardless of the result of step 522. This may be done, for example, in case of system instability. As another example, message 527 may instruct controller 513 to move switch Q1 to the ON state regardless of the result of step 522. This may be done, for example, in case of low irradiance on PV generators 501a-501m, which may cause the measured current to be low even when it may be safe to connect power sources 501n-501z to the string without surpassing an allowable string voltage level.

Once the controller 513 connects a power source to a string 505 by controlling switch Q1 to the ON state, controller 513 may, at step 524, measure one or more parameters (e.g., current through switch Q1 and/or voltage between terminals $T_1$ and T2). At step 525, controller 513 may compare the one or more measured parameters to thresholds. For example, if current through switch Q1 (Iq1) was measured at step 524, Iq1 may be compared to a current threshold at step 525. The current threshold may be the same as the current threshold at step 522, or may be lower than the current threshold at step 522. As another example, if voltage between terminals $T_1$ and T2 or across diode D1 (Vd1) was measured at step 524, Vd1 may be compared to a voltage threshold at step 525. The current threshold and/or the voltage threshold at step 525 may be statically or dynamically set, similar to the thresholds of step 522.

If the comparison results of step 525 are determined to be negative, the controller 513 may, after a short period of time (e.g., tens or hundreds of milliseconds, or seconds) return to step 524. If the comparison results of step 525 are determined to be positive, it may be an indication that the string voltage may have risen, and the controller 513 may proceed to step 526 and disconnect the power source (e.g., by switching switch Q1 to the OFF state).

At any point during carrying out method 510, a safety interrupt 528 may be transmitted (e.g., by a system power device 508) to a power device 509 (e.g., via communication device 515), and controller 513 may be configured to respond to the safety interrupt by disconnecting the power source between terminals T1 and T2 (unless the power source is already disconnected).

Method 510 may describe illustrative embodiments where power device 509 has two modes of operation, where switch Q1 is in the ON state or the OFF state, but might not be switched at high frequency to provide an average DC voltage between terminals T3 and T4 which is different from the voltage between terminals $T_1$ and T2.

Figure 5D:
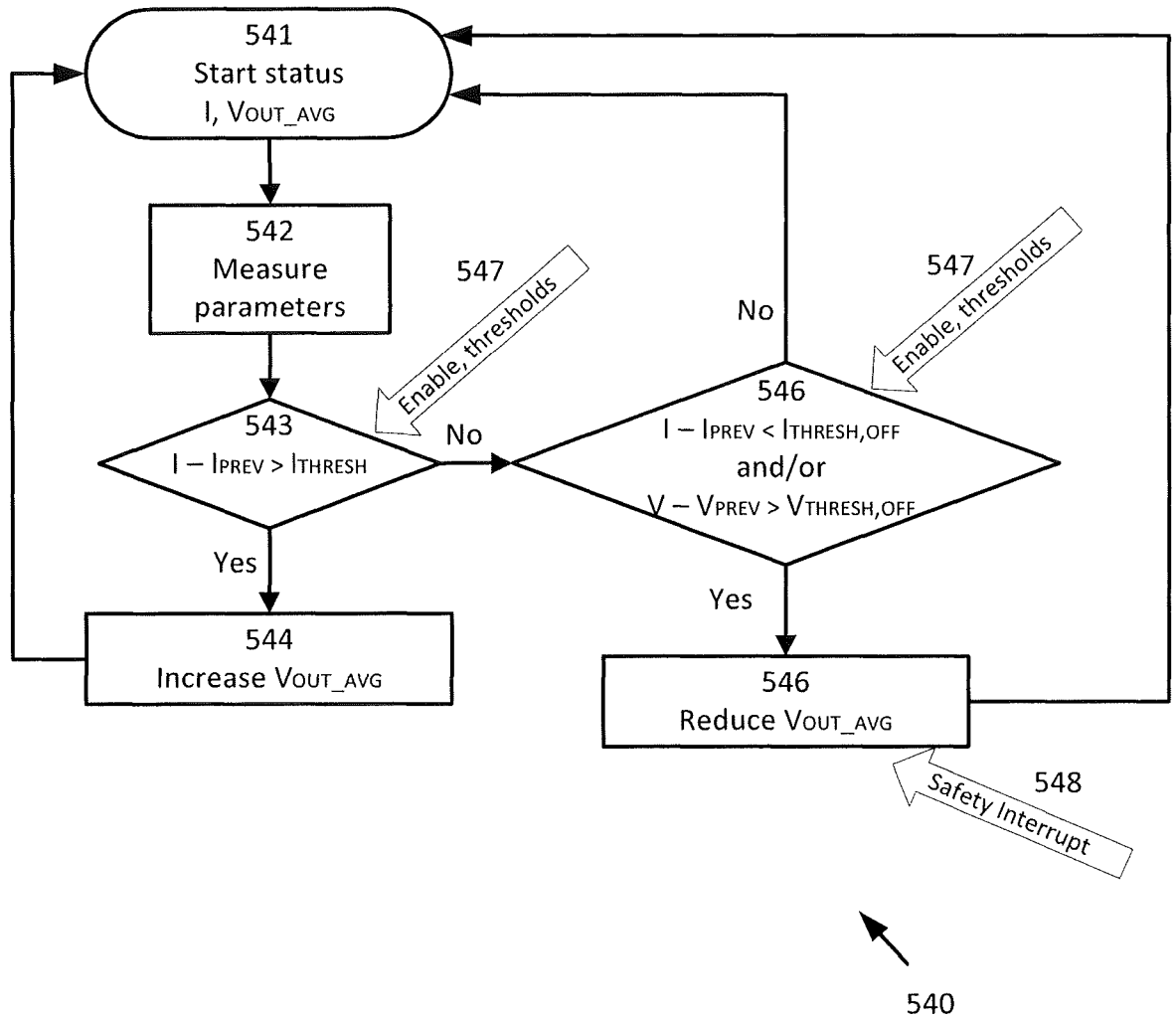
FIG. 5D is a flow chart illustrating a method for operating power devices, according to one or more illustrative embodiments.

Reference is now made to FIG. 5D, which illustrates a method 540 for operating power devices 509 according to illustrative embodiments. Method 540 may be carried out by a controller 513 controlling a power device 509 of FIG. 5B. The power device 509 may be connected to a power source (e.g., a PV generator 501) within a string 505 similarly to as illustrated in FIG. 5A. At initial conditions 520, the power source may be disconnected (i.e., controller 513 may be keeping a corresponding switch Q1 in the OFF position). The power source may be disconnected due to low string current flowing through diode D1, which may be indicative of a high voltage across serially connected power sources (e.g., PV generators 501a-501m of FIG. 5A), for example during system start-up (e.g., the early morning hours).

Method 540 may be similar to method 510 of FIG. 5C, with controller 513 configured to PWM-switch a switch Q1, providing an average DC voltage between terminals T3 and T4 which is different from the voltage between terminals T1 and T2. For example, if a power source having a voltage of 30V is connected between terminals T1 (a positive terminal) and T2 (a negative terminal), controller 513 may operate switch Q1 according to a duty cycle to provide an average DC voltage between terminals T3 and T4 which may be about 0V (when switch Q1 is always OFF), may be about 30V (when switch Q1 is always ON) and may be between 0V and 30V (when switch Q1 is PWM-switched). At step 541, a current I may be flowing through diode D1, and an average voltage between terminals T3 and T4 may be about Vout_avg. At step 542, parameters (e.g., the current and average voltage) may be measured. At 543, the measurements may be compared to previously saved parameter measurements (e.g., data saved in memory device 517 of FIG. 5B). For example, if the current increased by a certain amount or more, it may be an indication that string voltage has decreased, and the controller may proceed to step 544 and (by changing a duty cycle of switch Q1) increase the average DC voltage between terminals T3 and T4 and then return to step 541. The increase of the average DC voltage may be by a fixed amount (e.g., 1V), or a proportional amount (e.g. by 5%). The increase of the average DC voltage may also depend on the measured increase in current. If the current has not increased by a certain amount or more at step 543, the controller 513 may proceed to step 546 to determine if the current has decreased (that may indicate a rise in string voltage) or if an average DC voltage between T3 and T4 has increased. If the current has decreased (or the voltage has increased) by more than a certain amount, the controller may proceed to step 546 and reduce the average DC voltage between terminals T3 and T4 and then return to step 541. The reduction of the average DC voltage may be by a fixed amount (e.g. 1V), or a proportional amount (e.g. by 5%), and may depend on the measured voltage and/or current difference. After step 546, the controller may return to step 541.

Similarly to method 510, dynamic thresholds and/or enabling signals may be provided (e.g., by system power device 508) to controller 513, and safety interrupts may be used to instruct controller 513 to reduce the average DC voltage between terminals T3 and T4. In some cases, a safety interrupt may instruct controller 513 to immediately disconnect a power source connected between terminals T1 and T2. Additionally, control signals such as "keep alive—increase voltage", "keep alive—maintain voltage", and "keep alive—reduce voltage", may be provide to controller 513, with controller 513 configured to respond accordingly. An absence of a "keep alive" signal may indicate a safety condition and/or system malfunction, and controller 513 may be configured to disconnect a power source after not receiving a "keep alive" signal for a period of time (e.g., 1 second, 5 seconds, 10 seconds, etc.).

Figure 5E:
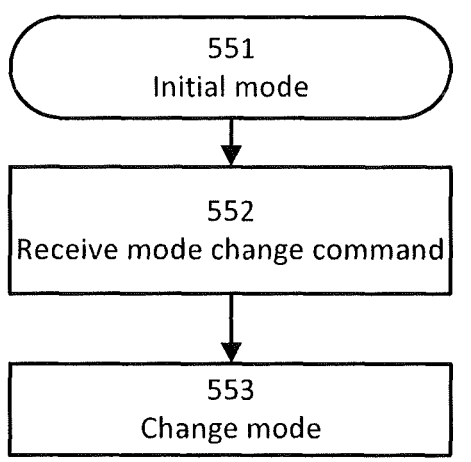
FIG. 5E is a flow chart illustrating a method for operating a power device in different modes, according to one or more illustrative embodiments.

Reference is now made to FIG. 5E, which shows a method for operating a power device 509 in different modes, according to illustrative embodiments. As mentioned above, power device 509 may be operated in several modes. In a first mode, a controller controlling a power device 509 may keep a power source (e.g., PV generator 501) disconnected from a string 505 regardless of measured parameters. In a second mode, the controller may keep the power source (e.g., PV generator 501) connected to a string 505 regardless of measured parameters. In a third mode, the controller may adjust a DC voltage output (e.g., between terminals T3 and T4) by a power device 509 according to measured parameters. In some variations of the third mode, an average DC voltage output may be adjusted by switching switch Q1 at high-frequency. In some variations of the third mode, the controller may selectively connect a power source to a power string when a high or increased string current is detected, and the controller may selectively disconnect the power source from the power string when a low string current and/or a high voltage between terminals T1 and T2 is measured. Method 550 may be carried out by a controller 513 controlling a power device 509. At step 551, the controller may be operating in an initial mode. At step 552, the controller may receive a command to change the operational mode. For example, the controller may be operating the power device in the first mode, to reduce a total string voltage. Before step 552, a system power device may send a command to a controller 513 to operate in the third mode, for example, to gradually increase the average DC voltage between terminals T3 and T4, and in response to receiving the command, at step 553, the controller 513 may operate in the third mode and gradually increase the average DC voltage between terminals T3 and T4 (according to, for example, method 540 of FIG. 5D).

Figure 5F:
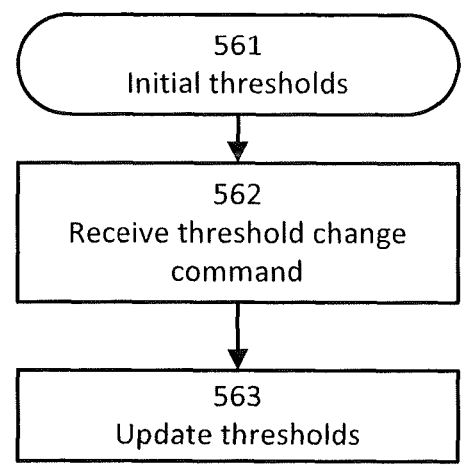
FIG. 5F is a flow chart illustrating a method for changing threshold parameters used in methods for operating power devices, according to one or more illustrative embodiments.

Reference is now made to FIG. 5F, which shows a method 560 for changing threshold parameters used in methods 510 and 540. Method 560 may be carried out by a controller 513 controlling a power device 509. As mentioned above, methods 510 and 540 may use thresholds for determining when it may be suitable to connect/disconnect a power source to/from a string 505, and/or increase or decrease a voltage between terminals T3 and T4 of a power device. The thresholds may be fixed or variable, and may be changed according to system-level parameters (e.g., voltage across a string 505, solar irradiance levels at various parts of the power system, a preferred operating point at the input to system power device 508. At step 561, controller 513 may be using certain thresholds in methods 510 and 540. At step 562, the controller 513 may receive updated thresholds (e.g., from system power device 508), and at step 563 the controller 513 may update the thresholds.

For example, at step 561, a controller 513 may be configured to connect a power source to a string 505 upon measuring a current of 7 A flowing between terminals T3 and T4. A system power device 508 may detect that the power system 500 is operating at suboptimal conditions (e.g., due to shading), and a current of 7 A might not be reachable under these conditions. System power device 508 may then send a command to controller 513, instructing the controller to change the threshold to 5A.

A system power device (e.g., system power device 508 of FIG. 5A) may implement maximum power point tracking (MPPT) methods with regard to one or more strings 505. In certain embodiments, an MPPT method may include (e.g., via a power converter included in system power device 508) periodically varying the voltage across or current through a string 505 and evaluating the available power at each operating point. If power devices 509 in string 505 are being operated simultaneously to connect and disconnect power sources (e.g., PV generators) 501 to/from the string, it may be more complicated to implement the MPPT method. For example, power devices 509 changing a string voltage may interfere with the system power device 508 varying the voltage across a string 505.

Figure 5G:
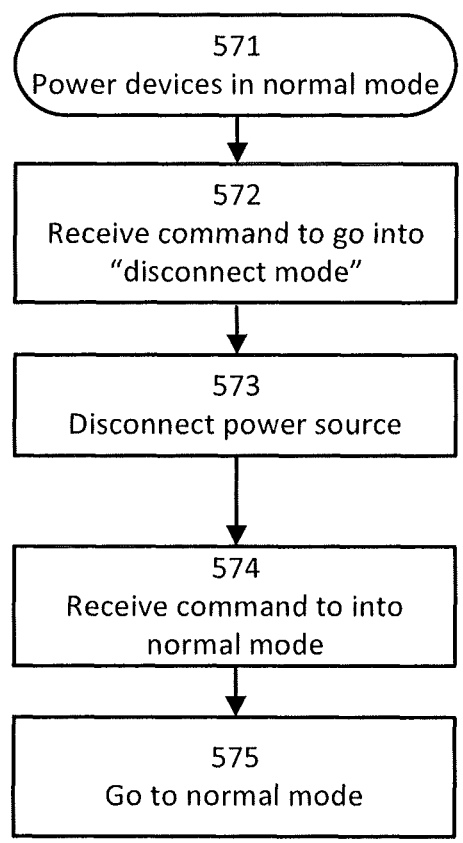
FIG. 5G is a flow chart illustrating a method for operating a power device, according to one or more illustrative embodiments.
Figure 5H:
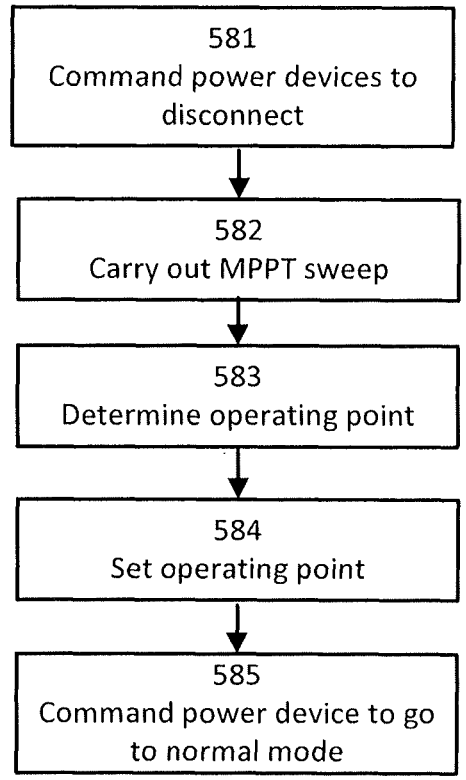
FIG. 5H is a flow chart illustrating a method for operating a system power device, according to one or more illustrative embodiments.
Figure 51:
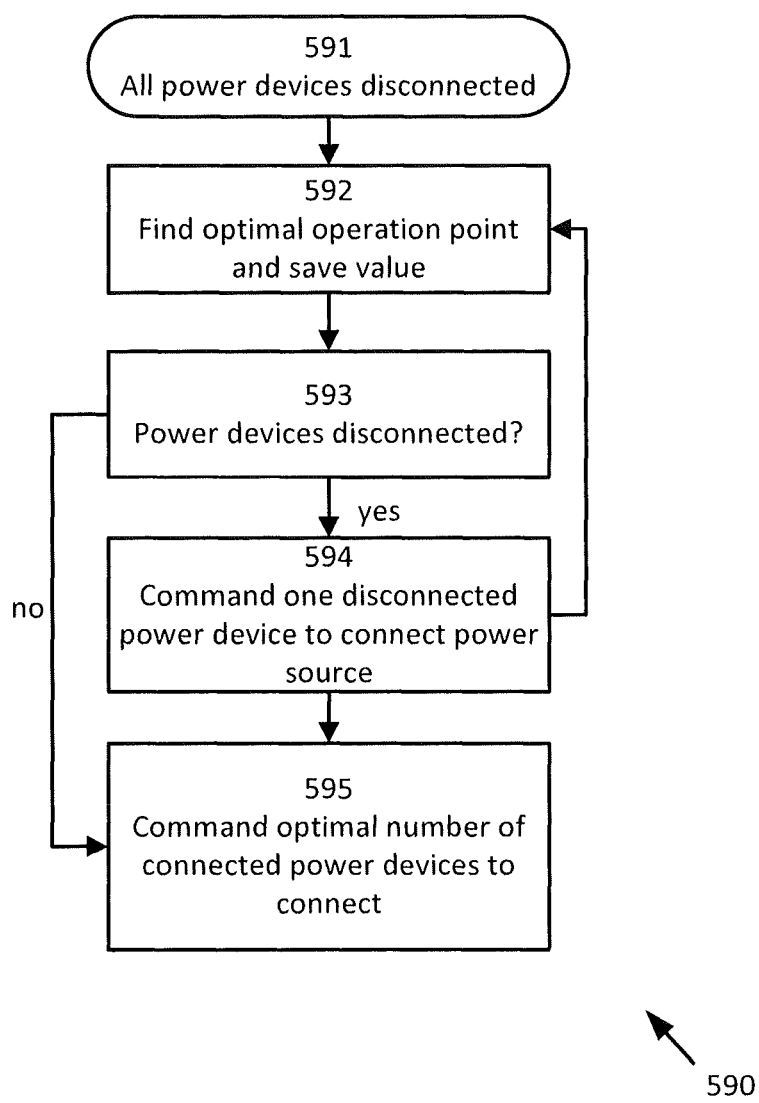

Reference is now made to FIGS. 5G and 5H, which shows illustrative methods 570 and 580 for operating a power device 509 and a system power device 508 as to apply an MPPT method to a string 505 comprising one or more power devices 509. Method 570 may be implemented by a power device 509 (e.g., by controller 513), and method 580 may be implemented by a system power device 508. At step 571, the power device 509 may be operating in a "normal" mode, for example, a mode enabling the power device 509 to connect a power source to a string 505. At step 581, system power device 508 may send a command to power device 509 to go into a "disconnect mode", e.g., a mode in which the power device 509 keeps switch Q2 OFF, disconnecting a power source connected between terminals T1 and T2. At step 572, the power device 509 may receive the command, and at step 573 the power device 509 may disconnect the power source. At step 582, the system power device 508 may carry out an MPPT parameter sweep to determine a preferred operating point (e.g., preferred voltage and/or current values for string 505) at step 583. At step 584, the system power device 508 may set the preferred operating point, for example, by fixing a preferred voltage across string 505. Once the preferred operating point is set, system power device 508 may, at step 585, command one or more power devices 509 to return to "normal mode", for example by enabling power devices 509 to implement methods 510 and/or 540 and connect power sources to string 505 when conditions are suitable. If multiple power devices 509 are connected in a string 505, system power device 508 may send a command to go to "normal mode" to each power device 509 at a different time, and/or may send a command to go to "normal mode" to a subset of the power devices 509, according to the preferred operating point.

Each power device 509, upon receiving a command to go to "normal mode" at step 574, may go to "normal mode" at step 575 (e.g., by executing steps 552 and 553 of method 550).

Reference is now made to FIG. 5I, which illustrates a method for selecting a preferred number of power devices 509 for connecting to a string 505. Method 590 may be carried out by a controller controlling a system power device 508, and may be applied with regard to a power system have at least one string 505 having serially connected power sources (e.g., PV generators 501a-501n) and power devices 509 connected to additional power sources (e.g., PV generators 501a-501n). At initial step 591, all power devices 509 may be in the first mode of operation, i.e., disconnecting corresponding power sources from string 505. At step 592, the controller may operate system power device 508 to determine a preferred (e.g., maximum-power) operating point for the current string configuration, and save the preferred operating point to memory. At step 593, the controller checks (e.g., by consulting a list stored in memory) if any power devices 509 in string 505 are in the first mode of operation. If there is at least one power device 509 that is disconnected (i.e., in the first mode of operation, with a corresponding power source disconnected from string 505), the controller may proceed to step 594 and command one power device 509 to move to a second mode of operation. i.e., to connect a power source to string 505. From step 594, the controller may return to step 592 and determine the preferred (e.g., maximum-power) operating point for the new current string configuration). If at step 593 it is determined that there are no unconnected power devices (e.g., all power devices 509 are in the second or third modes of operation), the controller may proceed to step 595 and command all power devices 509 to be in the first, second or third modes of operation as to operate the string 505 in the configuration have the optimal preferred operating point. A system power device 508 may repeat method 590 periodically (e.g., every several seconds or minutes) to maintain operation at a preferred operating point.

Figure 5K:
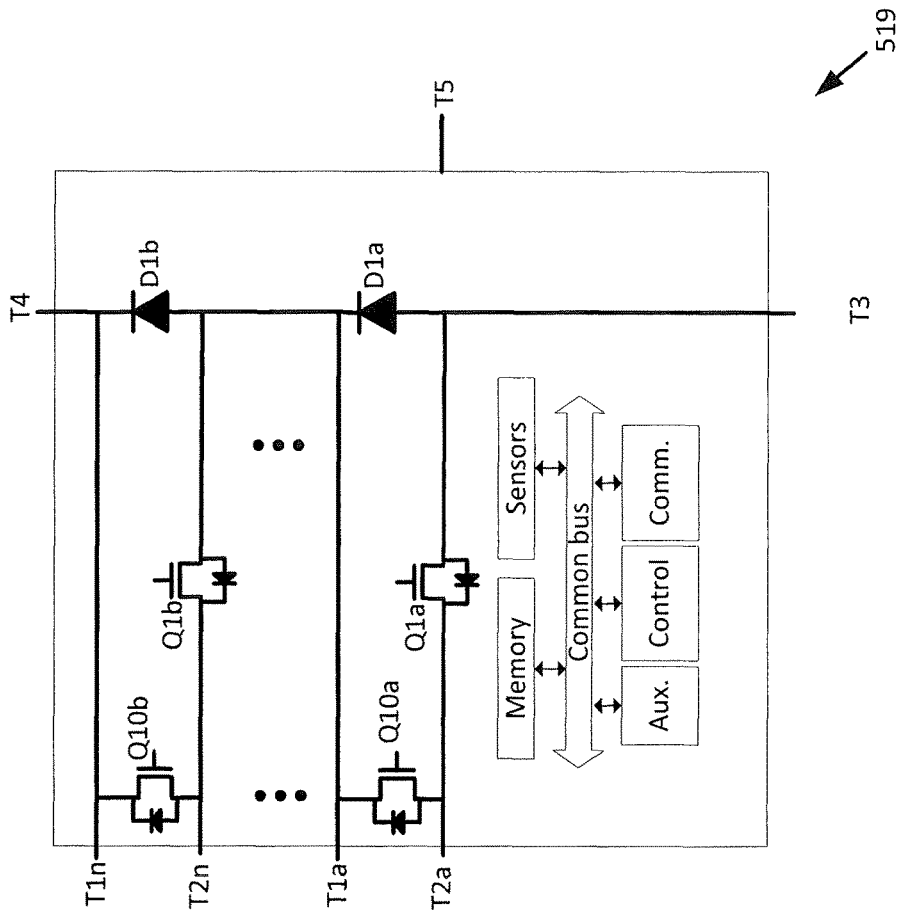
FIG. 5K shows a power device, according to one or more illustrative embodiments.
Figure 5J:
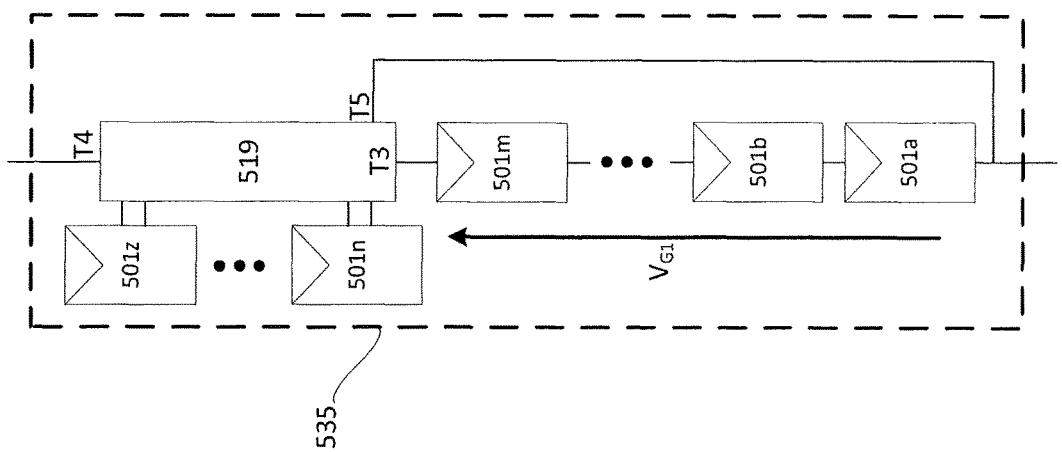
FIG. 5J shows a string of power sources, according to one or more illustrative embodiments.

Reference is now made to FIG. 5J, which illustrates a string 535 according to illustrative embodiments. String 535 may be used in addition to or instead of a string 505 of FIG. 5A. String 535 may include a first group of power sources (e.g., photovoltaic generators 501a-501m) directly connected in series, and a second group of power sources (e.g. PV generators 501n-501z) connected via power device 519. Power device 519 may have input terminals T3 and T5 for receiving power from the first group of power sources, and two input terminals for receiving power from each power source of the second group of power sources. Power device 519 may selectively connect zero, one or more power sources of the second group of power sources in series and/or in parallel with the first group of power sources, in accordance with a maximum allowable string voltage between terminals T4 and T5 and according to the operating points of the power sources in the first group of power sources.

Installing a power device 519 as illustrated in FIG. 5J may provide several advantages according to several features of illustrative embodiments. By having the first group of power sources connected between terminals T3 and T5, power device 519 may be able (e.g., using a suitable voltage sensor) to measure the voltage across the first group of power sources, and may use the measurements to determine whether zero, one or more power sources of the second group of power sources should be connected. Having enhanced sensing/measuring capabilities in a single device along with a controller configured to connect or disconnect additional power sources may simplify system control, and provide fast response-time to changing system conditions.

Reference is now made to FIG. 5K, which shows power device 519 according to illustrative embodiments. Power device 519 may feature a controller, memory device, sensors/sensor interfaces, communication device, and common bus similarly to power device 509 of FIG. 5B. Power device 519 may be formed by serially connecting a plurality of power devices 509 within a single enclosure, while sharing one or more of the controller, memory device, sensors/sensor interfaces, communication device, and common bus between the power devices. For example, a single controller may control all the switches of power device 519. In other embodiments, power device 519 may comprise multiple controllers that are communicatively connected to one another.

In some embodiments, power device 519 may further include one or more power converters (e.g., DC/DC converters if power sources 501 are PV generators and the string 535 output is a DC output) configured to provide an adjustable output voltage such that the total string voltage is equal to or less than a maximum allowable string voltage.

A method for operating power device 519 may be carried out by a controller, and may be described as follows:
  a. Measure (e.g., via a sensor) the voltage between terminals T3 and T5 which corresponds to the voltage across the first group of power sources.
  b. Compare the measured voltage to a maximum allowable string voltage.
  c. If the measured voltage is above the maximum allowable string voltage, operate one or more switches to disconnect and/or short-circuit a power source connected between a pair of terminals T1 and T2 and in series with the first group of power sources.
  d. If the measured voltage is substantially less than the maximum allowable string voltage, operate one or more switches to connect an additional power source connected between a pair of terminals T1 and T2 in series with the first group of power sources. If no additional power source is available, do nothing.

In embodiments where power device 519 has a power converter, steps (c) and (d) may be adapted to allow adjusting an output voltage of power converter, rather than disconnecting a power source.

In some embodiments, serial connections of power sources may be replaced by or augmented with parallel connections of power sources, and monitoring a total string voltage and adjusting serial connections to comply with a maximum allowable string voltage may be replaced by monitoring a total string current and adjusting parallel connections to comply with a maximum allowable string current.

Power device 519 may be further designed to provide string-level functionality, for example, monitoring and/or data transmission of string parameter values, for example, current measurements, string voltage measurements, string power measurements, and/or temperature measurements. Power device 519 may include built-in safety devices such as fuses and/or disconnect switches (installed, for example, at terminals T3, T4 and/or T5), a residual current detector.

In further embodiments, a single power device 519 may feature additional string input terminals (e.g., additional terminals T5) and may combine the current and power from multiple strings at a single output (e.g., between terminals T3 and T5) in addition to selectively switching additional power source in or out of the strings, according to a maximum allowable string voltage.

Figure 6A:
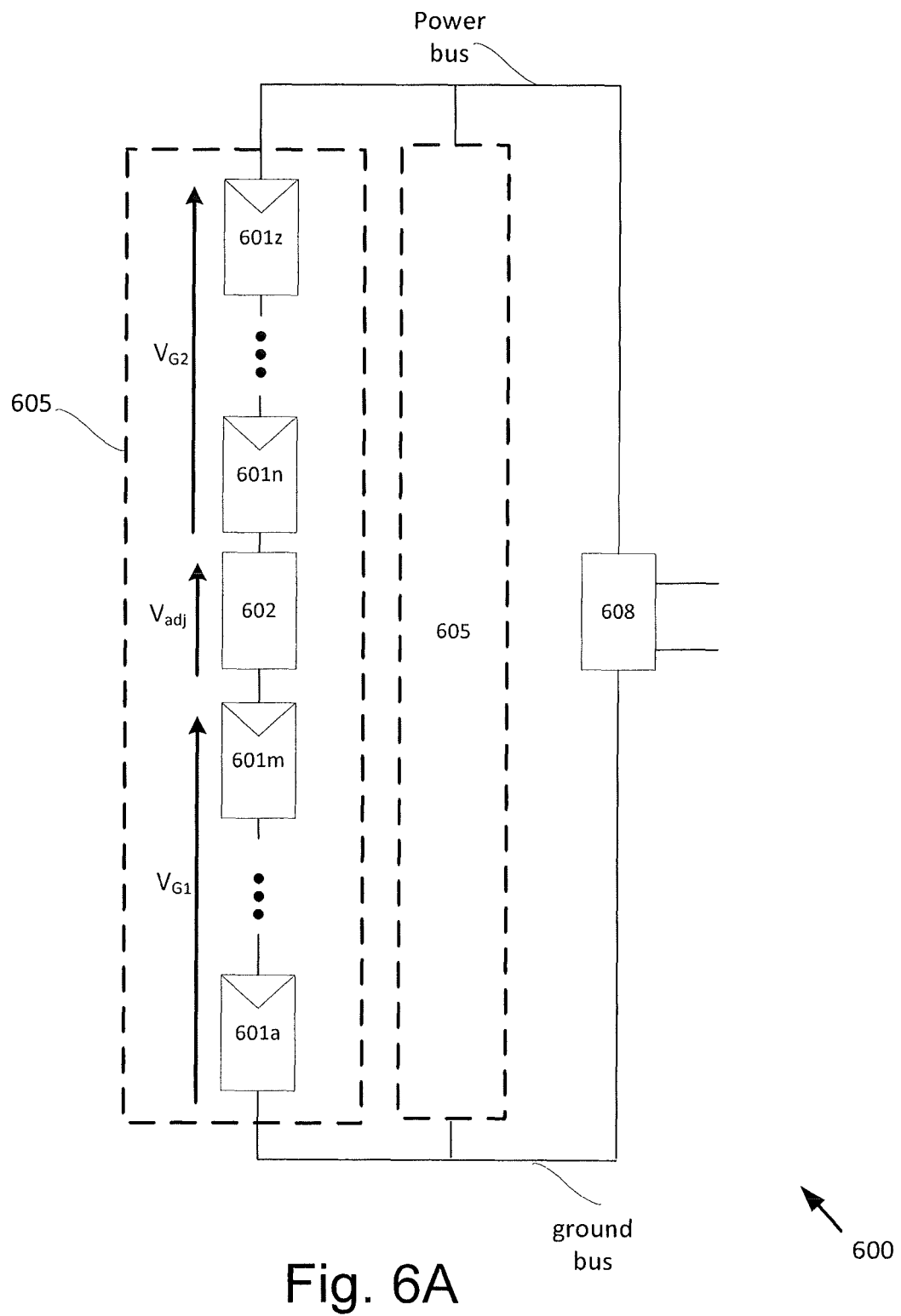
FIG. 6A shows a power system, according to one or more illustrative embodiments.

Reference is now made to FIG. 6A, which illustrates a power system 600 according to illustrative embodiments. Power system 600 may include one or more parallel-connected strings 605. Each string 605 may be connected between a ground bus and a power bus, and may include a first group of power sources (e.g., photovoltaic generators 601*a*-601*m*) connected in series and having a total voltage of $V_{G1}$, a power device 602 connected in series and having a voltage of $V_{adj}$, and a second group of power sources (e.g., photovoltaic generators 601*n*-601*z*) connected in series and having a total voltage of $V_{G2}$. A system power device 608 may be connected in parallel to the one or more strings 605. In some embodiments, system power device 608 may include a DC/AC inverter and may output alternating current (AC) power to a power grid, home or other destinations. In some embodiments, system power device 608 may comprise a combiner box, transformer and/or safety disconnect circuit. For example, system power device 608 may comprise a DC combiner box for receiving DC power from a plurality of strings 605 and outputting the combined DC power. In some embodiments, system power device 608 may include a fuse coupled to each string 605 for overcurrent protection, and/or one or more disconnect switches for disconnecting one or more strings 605.

Power device 602 may be designed and configured to provide a voltage Vadj to maintain the total voltage across each string 605 under a maximum allowable string voltage. The total string voltage may equal $V_{G1}+V_{G2}+V_{adj}$. For example, if a maximum allowable string voltage is 1200V, and the total voltage across the first group of power sources and the second group of power sources is $V_{G1}+V_{G2}=1400V$, power device 602 may be operated to provide a voltage of Vadj=−200V to maintain the string voltage at or under 1200V. By designing a power system in this manner, strings 605 may include an increased number of power sources (e.g., PV generators) for providing an increased energy yield at optimal operating conditions without creating potentially dangerous voltages (e.g., voltages dangerous to humans, or voltages that may damage equipment) under other operating conditions (e.g., open-circuit conditions).

In some embodiments, power device 602 may be connected at an end or a beginning of the string 605 (e.g., directly to the ground bus or the power bus). In the illustrative embodiment of FIG. 6A, power device 602 is shown intermediately connected within string 605. Connecting power device 602 intermediately may divide a string 605 into two sections, and power device 602 may be operated to limit the voltage across each section to be below a maximum allowable voltage.

In some embodiments, power device 602 may be operated to dissipate excess power while being operated to have a substantial negative voltage (i.e., Vadj<0 with current flowing from the ground bus to the power bus). In some embodiments, power device 602 may include a storage device (e.g., a capacitor and/or a battery) for storing excess power while being operated at a negative voltage, at power device 602 may provide the stored power to power system 600 at a later time, when there is no longer any need to maintain a substantial negative voltage.

Reference is now made to FIG. 6B, which illustrates a numerical example of values that may be measured during operation of power system 600 of FIG. 6A. As a non-limiting example, a maximum allowable string voltage may be 1200V, and each serially connected power source may have an open-circuit voltage of about 40V and a maximum-power-point voltage of about 31.5-32V. The first group of power sources and the second group of power sources may each comprise 19 power generators. At timestamp 1, all power sources may be open-circuited, with the first group and the second group having a voltage of 19*40=760V, and power device 602 having a voltage of −320V to maintain the string voltage at the allowable 1200V. Between timestamps 2-16, the string current may gradually increase (e.g., due to increasing solar irradiance irradiating the power sources), with the power source voltages decreasing, and power device 602 decreasing the absolute voltage of the adjustment voltage from −320V to, eventually, −20V. At timestamp 17, each power device may be operating at about an MPP voltage of 31.7V. Since 2*19*31.7=1200V, power device 602 might not provide an adjustment voltage. At MPP operating conditions, each string 605 may be providing about 11280 W of power generated by 38 power sources, which may be significantly more than the power that would be generated by a reduced number of power sources (in this numerical example, 1200/40=30) which would be connected if power device 602 were not installed to reduce the string voltage at operating conditions other than MPP operating conditions. When at MPP conditions, power device 602 may be operated to function substantially as a short-circuit (e.g., as a MOSFET in the ON state).

Figure 6C:
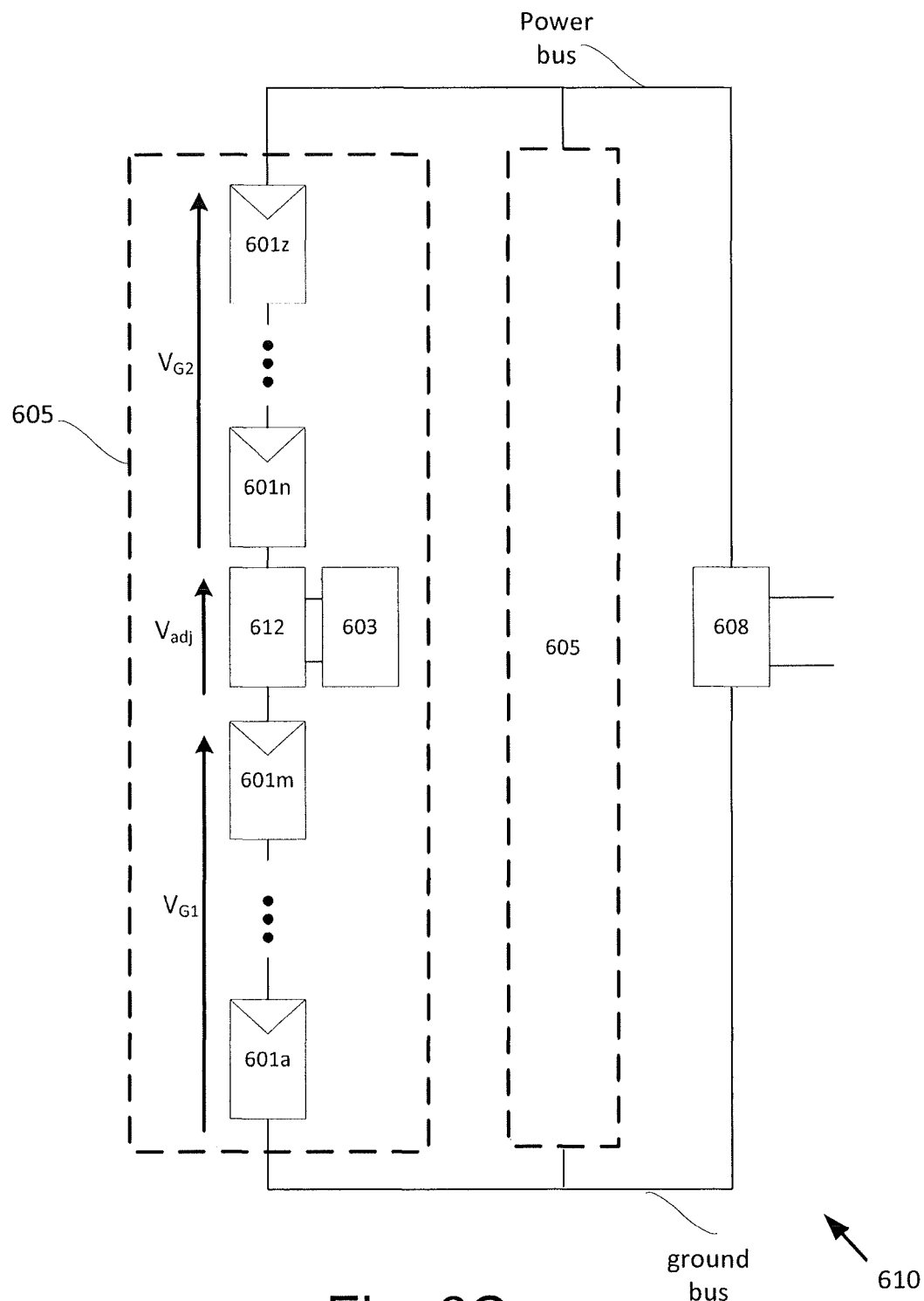
FIG. 6C shows a power system, according to one or more illustrative embodiments.

Reference is now made to FIG. 6C, which illustrates a power system 610 according to illustrative embodiments. Power system 610 may include one or more parallel-connected strings 615. Strings 615 may be similar to string 605 of FIG. 6A, with power device 602 of FIG. 6A replaced by power device 612. Power device 612 may be similar to power device, but may be additionally configured to convert power received from string 615 to storage device 603 (e.g., a capacitor, battery, flywheel, etc.). Power device 612 may comprise a bidirectional power converter (e.g., a DC/DC and/or a DC/AC converter) configured to charge storage device 603 when power device 612 provides a substantial negative voltage (e.g., at timestamps 2-16 of FIG. 6B), and to discharge storage device 603 and provide additional power to string 615 when the string is operating such that there is no substantial negative voltage across power device 612.

Auxiliary power circuit 704 may be coupled in parallel to transistor Q2. A first input of auxiliary power circuit 704 may be coupled to conductor 708, and a second input of auxiliary power circuit 704 may be coupled to conductor 709.

In some embodiments, auxiliary power circuit 704 may comprise analog circuitry configured to provide an appropriate control signal to transistor Q2. In some embodiments, auxiliary power circuit 704 may provide power to controller 710, with controller 710 configured to provide a control signal to transistor Q2. Since power device 702a might not have input terminals receiving power from a power source, auxiliary power circuit 704 may be designed to harvest power from the power flowing through conductors 708 and 709. Auxiliary power circuit 704, according to various illustrative embodiments, will be described in greater detail below.

Figure 7B:
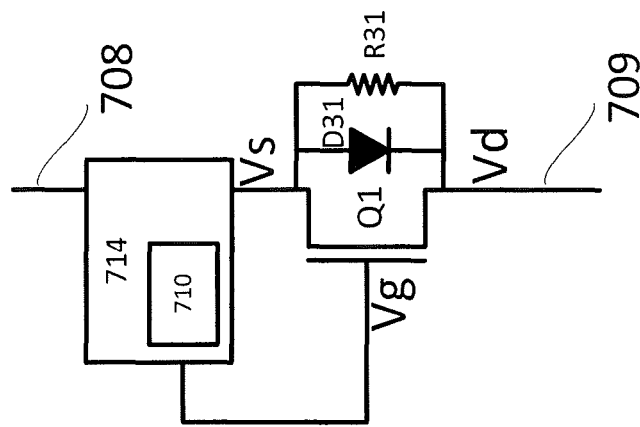
FIG. 7B shows a power device comprising an auxiliary power circuit, according to one or more illustrative embodiments.

Reference is now made to FIG. 7B, which illustrates a power device 702b comprising an auxiliary power circuit according to illustrative embodiments. Power device 702b may comprise conductors 708 and 709, transistor Q2 and controller 710, which may be similar to or the same as similarly-reference elements of FIG. 7A.

Auxiliary power circuit 714 may be coupled in series with transistor Q2. A first input of auxiliary power circuit 714 may be coupled to conductor 708, and a second input of auxiliary power circuit 704a may be coupled to transistor Q2.

Figure 7A:
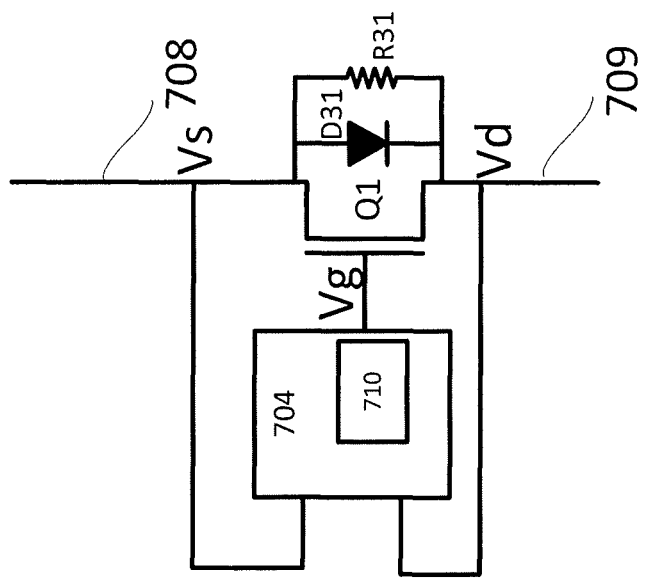
FIG. 7A shows an auxiliary power circuit, according to one or more illustrative embodiments.
Figure 7C:
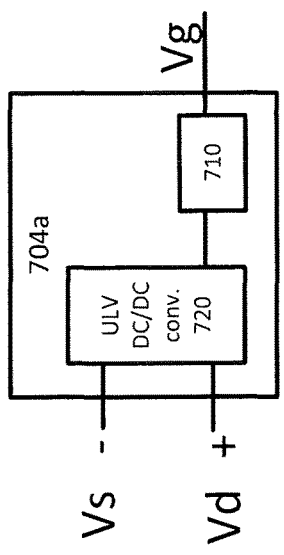
FIG. 7C shows an auxiliary power circuit, according to one or more illustrative embodiments.

Reference is now made to FIG. 7C, which depicts an auxiliary power circuit according to illustrative embodiments. Auxiliary power circuit 704a may be used as auxiliary power circuit 704 of FIG. 7A. A first input to auxiliary power circuit 704a may be coupled to the source terminal of a transistor (e.g., Q2 of FIG. 7A), and a second input to auxiliary power circuit 704a may be coupled to the drain terminal of a transistor. An output of auxiliary power circuit 704a may be coupled to the gate terminal of a transistor. Auxiliary power circuit 704a may comprise Ultra Low Voltage Direct-Current to Direct Current (DC/DC) converter (ULVC) 720. Controller 710 may be an analog or digital controller, and may be similar to controller 303 of FIG. 3. Controller 710 may be integrated with or separate from auxiliary power circuit 304a. In some embodiments, an output of ULVC 720 may be coupled to an input of controller 710, with controller 710 applying a voltage to the gate of a transistor. ULVC 720 may be configured to receive a very low voltage (e.g., tens or hundreds of millivolts) at its input, and output a substantially larger voltage (e.g., several volts). ULVC 720 may be variously implemented. In some embodiments, ULVC may comprise an oscillator charge pump and/or several conversion stages. Variations of illustrative circuits found in "0.18-V Input Charge Pump with Forward Body Biasing in Startup Circuit using 65 nm CMOS" (P. H. Chen et. al., CIEEE 2010), "Low voltage integrated charge pump circuits for energy harvesting applications" (W. P. M. Randhika Pathirana, 2014) may be used as or as part of ULVC 720.

Figure 7D:
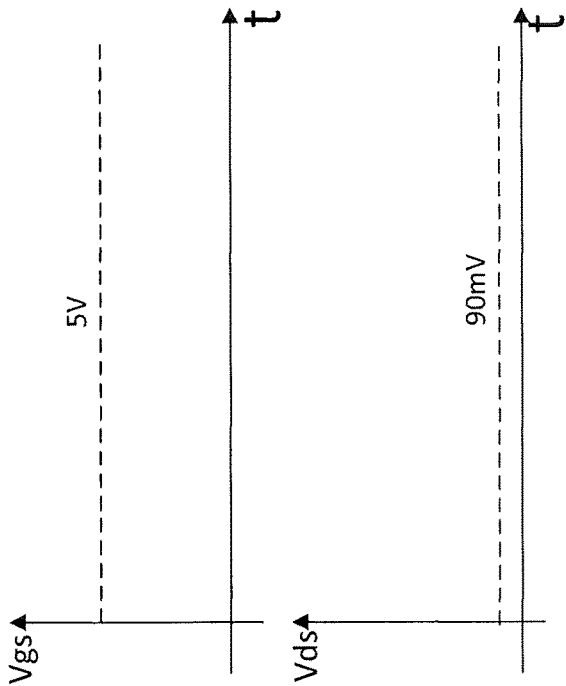
FIG. 7D shows a timing diagram for operating the auxiliary power circuit of FIG. 7C, according to one or more illustrative embodiments.
Figure 7D:
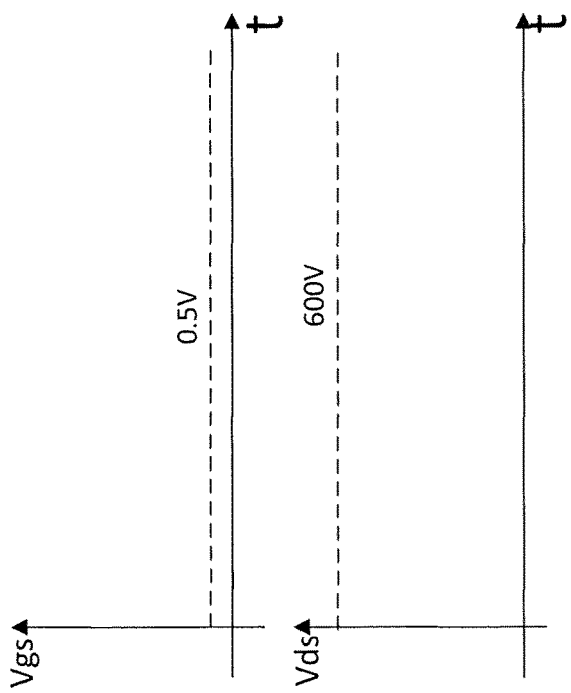

Reference is now made to FIG. 7D, which shows a timing diagram for operating auxiliary power circuit 704a of FIG. 7C according to illustrative embodiments. As a numerical example, auxiliary power circuit 704a may be coupled as described above to the terminals of a MOSFET. ULVC 720 may be coupled between the source (Vs) and drain (Vd) terminals of the MOSFET. When the MOSFET is in the OFF state, the voltage drop between terminals Vs and Vd may be substantial, for example, up to 320V (according to the numerical example of FIG. 6B). The voltage drop may be the adjustment voltage provided by power device 602 when serially-connected power sources in string 605 are in an open-circuit condition. When the MOSFET is in the OFF state, ULVC 720 may be bypassed or disabled, with the substantial voltage drop between terminals Vs and Vd processed to provide power to controller 710. Controller 710 may hold the voltage between the MOSFET gate and source terminals to a low value, (e.g., 0V or 1V, under a minimum source-gate threshold of 2V), maintaining the MOSFET in the OFF state.

Still referring to FIG. 7D, controller 710 may receive a command via a communication circuit (not explicitly depicted) to gradually turn the MOSFET to the fully-ON state. The MOSFET may be gradually turned ON according to a measured current flowing though the MOSFET. One or more sensors (not explicitly denoted) may measure the current flowing through the MOSFET and provide the measurements to controller 710. As the current flowing through the MOSFET increases, controller 710 may gradually drive the MOSFET to an increases ON state (e.g., by increasing the gate-to-source voltage) and the negative voltage drop across the MOSFET may accordingly decrease. In the fully-ON state, controller 710 may increase the gate-to-source voltage to about 5V. In illustrative PV systems, the current flowing through a PV string at certain points of operation may be about 10 A. At a gate-to-source voltage of 5V and drain-to-source current of 10 A, the drain-to-source voltage may be about 90 mV. ULVC 720 may boost the drain-to-source voltage of 90 mV to a voltage of several volts or more (e.g., 5V, 10V, 12V or 20V) for powering controller 710. Controller 710 may continuously hold the gate-to-source voltage at about 5V until a command is received to turn the MOSFET OFF. In some embodiments, the MOSFET is turned OFF at the end of every day, i.e., when PV generators cease producing significant power due to nightfall. In some embodiments, the MOSFET may be gradually turned OFF by gradually decreasing the gate-to-source voltage. When it is time to turn the MOSFET fully OFF, controller may decrease the gate-to-source voltage back to about 0V or 1V.

Operating auxiliary power circuit 704a according to the illustrative timing diagrams of FIG. 7D may provide several advantages. For example, the steady-state power consumed by power device 702a using auxiliary power circuit 704a may be low, in this illustrative example, 90 mV*10 A=900 mW when in the fully-ON state, and 30V*10 uA=0.3 mW when in the OFF position. Furthermore, the steady-state voltage across power device 702a may be substantially constant when in the fully-ON state (e.g., 90 mV).

Figure 7E:
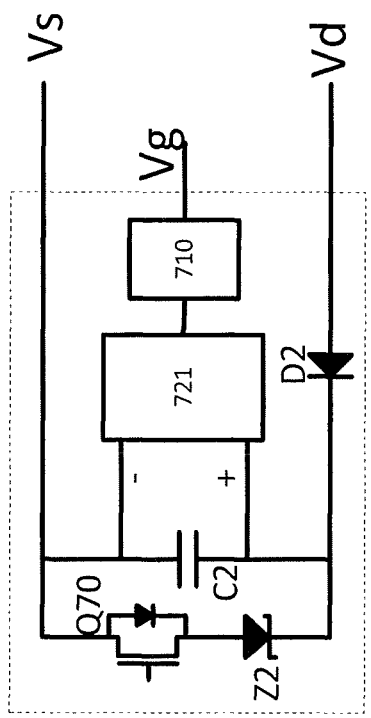
FIG. 7E shows an auxiliary power circuit, according to one or more illustrative embodiments.

Reference is now made to FIG. 7E, which depicts an auxiliary power circuit according to illustrative embodiments. Auxiliary power circuit 704b may be used as auxiliary power circuit 704 of FIG. 7A. A first input to auxiliary power circuit 704b may be coupled to the source terminal of a transistor (e.g., Q2 of FIG. 7A), and a second input to auxiliary power circuit 704b may be coupled to the drain terminal of a transistor. An output of auxiliary power circuit 704b may be coupled to the gate terminal of a transistor. Auxiliary power circuit 704b may comprise capacitor C2, diode D2, diode Z2, transistor Q70 and converter (in this case a DC-to-DC converter) 721. In some embodiments, capacitor C2 may be replaced by a different charge device (e.g., a battery). Controller 710 may be analog or digital, and may be similar to controller 303 of FIG. 3. Controller 710 may be integrated with or separate from auxiliary power circuit 304a. Diode Z2 may be a Zener diode designed to limit and hold a reverse-bias voltage to a predetermined value. In this illustrative embodiment, diode Z2 is assumed to have a reverse-bias voltage of 4V. A first input to auxiliary power circuit 704b may be coupled to the source terminal of a transistor (e.g., Q2 of FIG. 7A), and a second input to auxiliary power circuit 704b may be coupled to the drain terminal of a transistor (e.g., Q2). An output of auxiliary power circuit 704b may be coupled to the gate terminal of a transistor (e.g., Q2). In some embodiments, an output of converter 721 may be coupled to an input of controller 710, with controller 710 applying a voltage to the gate of a transistor. Converter 721 may be configured to receive a voltage of several volts (e.g., between 3V-10V) at its input, and output a voltage for powering controller 710 or controlling the gate voltage of a transistor gate terminal.

The anode of diode D2 may be coupled to a transistor drain terminal (Vd), and the cathode of diode D2 may be coupled to the cathode of diode Z2 and a first terminal of capacitor C2. The anode of diode Z2 may be coupled to a drain terminal of transistor Q70, with the source terminal of transistor Q70 coupled to a transistor source terminal (Vs) and to a second terminal of capacitor C2. The gate voltage of transistor Q70 may be controlled by controller 710 (the control line is not explicitly depicted). The inputs of converter 721 may be coupled in parallel with capacitor C2.

Auxiliary power circuits 704a-b and 714 may be operated to provide a voltage drop across the terminals of power device 702 according to safety and effective system operation requirements. The drain-to-source voltage may be desired to be low during normal system operation, when power device 702 is in the "fully ON state", i.e., when the switch provides a low-impedance path for photovoltaic power to flow through a PV string. When power device 702 is in a "fully OFF state", power device 702 may be required to provide a drain-to-source voltage of a required string adjustment voltage. When power device 702 is an intermediate state (i.e., not fully ON or fully OFF), power device 702 may provide an adjustment voltage to reduce a full string voltage to within allowable limits.

Referring back to FIG. 7E, controller 710 may operate transistor Q70 and transistor Q2 of FIG. 7A to provide a voltage drop across the terminals of power device 702 according to safety and effective system operation requirements. In the "steady OFF state", transistors Q1 and Q70 may be held in the OFF state. In the "fully ON state" transistor Q2 may be ON, providing a low impedance path between the drain and source terminals, and transistor Q70 may be either ON or OFF. It may be desirable during the "steady ON state" to temporarily move Q1 to the "temporarily OFF state" for a short period of time, to allow capacitor C2 to recharge and continue providing operational power to controller 710. In the "temporarily OFF" state, transistor Q2 may be OFF and transistor Q70 may be ON. Diode Z2 may provide a limited charging voltage (e.g., 4V) across the terminals of capacitor C2, with capacitor C2 providing a current path for the current of a PV string.

Reference is now made to FIG. 7F, which shows a timing diagram for operating auxiliary power circuit 704b of FIG. 7E according to an illustrative embodiment. As a numerical example, auxiliary power circuit 704a may be coupled as described above to the terminals of a MOSFET. Converter 721 may be coupled between the source (Vs) and drain (Vd) terminals of the MOSFET. When the MOSFET is in the steady-OFF-state, the voltage drop between terminals Vs and Vd may be substantial, e.g., close to the open-circuit voltage of a PV generator. When the MOSFET is in the steady-OFF-state, converter 721 may be bypassed or disabled, with the substantial voltage drop between terminals Vs and Vd processed to provide power to controller 710. In some embodiments, when the MOSFET is in the steady-OFF-state, converter 721 may process the drain-to-source voltage to provide power to controller 710. Controller 710 may hold the voltage between the MOSFET gate terminal and source terminals to a low value, (e.g., 0V or 1V, under a minimum source-gate threshold of 2V), maintaining the MOSFET in the OFF position. When the MOSFET is in the steady-OFF-state, capacitor C2 may be charged to about the voltage between the drain and source terminals. In some embodiments, diode Z2 may be disconnected (e.g., by turning Q70 to the OFF state), to increase the drain-to-source voltage when the MOSFET is in the steady-OFF-state. In some embodiments, having a large drain-to-source voltage (e.g., about the same voltage as a PV generator open-circuit voltage) when the MOSFET is in the steady-OFF-state increases system safety by decreasing the total voltage across a PV generator and an accompanying safety switch.

Still referring to FIG. 7F, controller 710 may receive a command via a communication circuit (not shown in the figures), or independently determine according to measured parameters (e.g., the MOSFET current) to turn the MOSFET to the fully-ON state. Controller 710 may increase the gate-to-source voltage of Q1 to about 6V. In illustrative PV systems, the current flowing through a PV string at certain points of operation may be about 10 A. At a gate-to-source voltage of 6V and drain-to-source current of 10 A, the drain-to-source voltage may be about 65 mV. Diode D2 might not be forward biased (e.g., if diode has a forward voltage of 0.6V, a drain-to-source voltage of 65 mV might not forward-bias diode D2), disconnecting capacitor C2 from the drain terminal. Capacitor C2 may slowly discharge by providing power to converter 721. Converter 721 may include circuitry (e.g. analog comparators) to monitor the voltage across capacitor C2, and may respond to the voltage across capacitor C2 falling below a first threshold. If the voltage across capacitor falls below the first threshold, controller 710 may reduce the gate-to-source voltage to about 0V or 1V, resulting in the MOSFET moving to the OFF state. Diode D2 may then become forward-biased, and diode Z2 may limit the drain-to-source voltage to a second threshold. Transistor Q70 may be held in the ON state, allowing diode Z2 to regulate the drain-to-source voltage. Capacitor C2 may then be rapidly charged back to about the voltage level of the second threshold, with controller 710 configured to increase the gate-to-source voltage back to 6V when capacitor C2 reaches the second threshold voltage. This iterative process may repeat itself while the MOSFET is operating in a "steady ON state" mode. In the illustrative embodiment shown in FIG. 7F, the first threshold is 2V, and the second threshold is 4V. The voltage across capacitor C2 varies between the two levels, with the gate-to-source voltage alternating between about 0V and about 6V, and the drain-to-source voltage alternating between 4V and 65 mV.

Operating auxiliary power circuit 704b according to the illustrative timing diagrams of FIG. 7F may provide several advantages. For example, a converter designed to receive an input voltage between 2-30V (e.g., converter 721) may be cheap, efficient and easy to implement. In some embodiments, additional Zener diodes may be coupled in series with diode Z2, increasing the first voltages. Increasing the first threshold voltage (e.g., to 10V, 15V or 20V, respectively) may provide advantages such as decreasing the frequency of charge-discharge cycles over capacitor C2, and may provide a voltage to converter 721 which may be easier to process.

It is to be understood that illustrative operating points comprising MOSFET drain-to-source voltages of 65 mV and 90 mV, MOSFET gate-to-source voltages of 5V and 6V, and MOSFET drain-to-source currents of 10A are used for illustrative purposes and are not intended to be limiting of operating points used in conjunction with illustrative embodiments disclosed herein. In some embodiments, multiple MOSFET transistors may be parallel-coupled to reduce ON-state resistance, thereby reducing the drain-to-source voltage across MOSFETs when in the ON state. For example, coupling five MOSFETs in parallel may reduce a drain-to-source ON-state voltage from 65 mV to 15 mV.

Figure 7H:
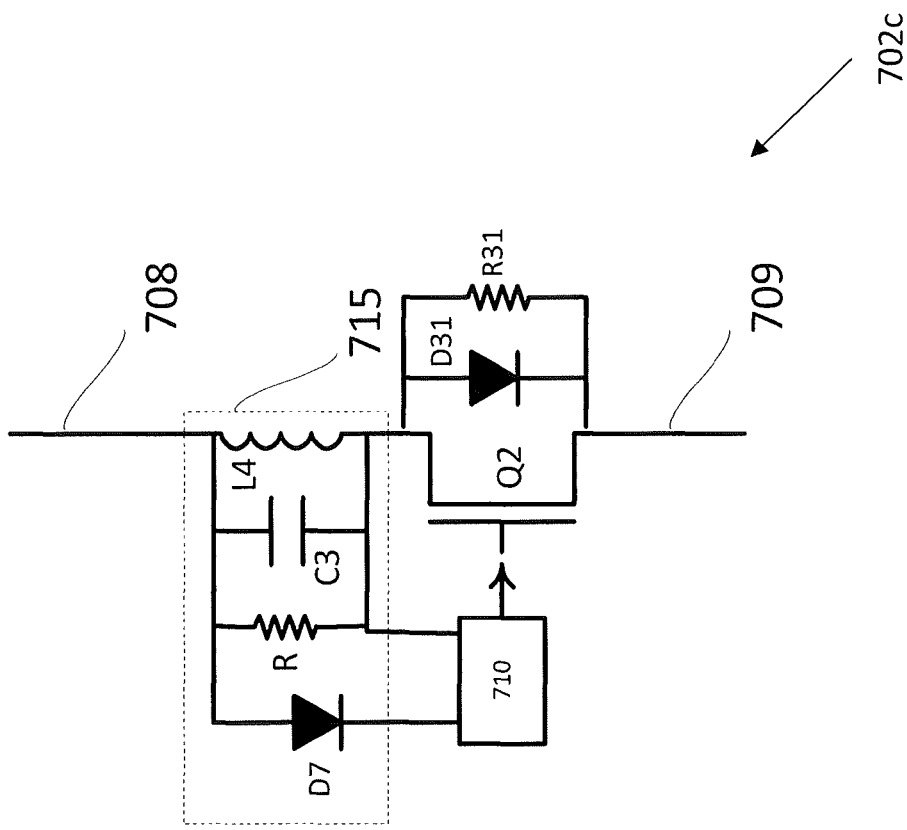
FIG. 7H shows a safety switch comprising an auxiliary power circuit, according to one or more illustrative embodiments.
Figure 7G:
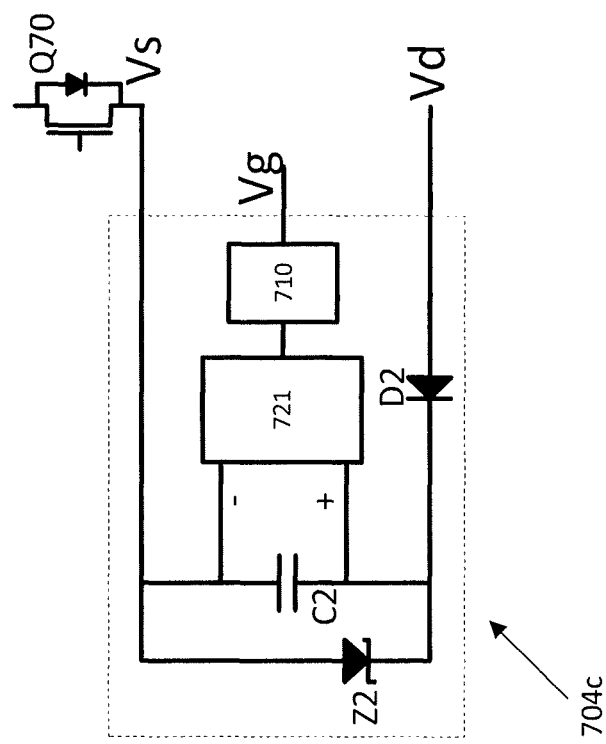
FIG. 7G shows an auxiliary power circuit, according to one or more illustrative embodiments.

Reference is now made to FIG. 7G, which depicts an auxiliary power circuit according to illustrative embodiments. Auxiliary power circuit 704c may be used as auxiliary power circuit 704 of FIG. 7A. Auxiliary power circuit 704c may be similar to auxiliary power circuit 704b, with a modification in that the anode of diode Z2 is coupled to the drain terminal of transistor Q2 (Vs), and that the drain terminal of transistor Q70 is also coupled to the source terminal of transistor Q2 (Vs). When power device 702 is in the "fully ON state", transistors Q1 and Q70 may be ON, providing a low impedance path for PV string current. When power device 702 is in the "fully OFF state", transistors Q1 and Q70 may be OFF, preventing a low impedance path for a PV string current, and providing a substantial voltage drop across the terminals of power device 702 (e.g., about the same voltage or a slightly lower voltage than a PV-generator open-circuit voltage). When power device 702 is in the "temporarily OFF state", transistor Q2 may be OFF and transistor Q70 may be ON, diode Z2 providing a charging voltage to capacitor C2 and Q70 providing a low-impedance current path for a PV string current.

Reference is now made to FIG. 7H, which illustrates a safety switch comprising an auxiliary power circuit according to illustrative embodiments. Power device 702c may comprise conductors 708 and 709, transistor Q2, controller 710 and auxiliary power circuit 715. Auxiliary power circuit 715 may be used auxiliary power circuit 714 of FIG. 7B. In this illustrative embodiment, auxiliary power circuit 715 may double as a power line communication (PLC) device. Inductor L4, capacitor C3 and resistor R may be coupled in parallel, with a first node of inductor L4 coupled to conductor 708, and a second node of inductor L4 coupled to the source terminal of transistor Q2. The values of inductor IA and capacitor C3 may be selected to resonate at a resonant frequency (e.g., 60 kHz).

Still referring to FIG. 7H, an external device (e.g., system power device 110 of FIG. 1) may transmit a PLC high-frequency alternating current signal (e.g., using frequency shift keying, phase shift keying, amplitude modulation, or other modulation schemes) over conductor 708. The PLC signal may induce a high-frequency alternating-current voltage drop across the terminals of resistor R, with diode D7 providing a voltage to controller 710 when the voltage across resistor R is positive (i.e. the voltage at conductor 708 is higher than the voltage at the source terminal of transistor Q2). In some embodiments, diode D7 may be replaced by a "full bridge" of diodes providing a voltage to controller 710 when the voltage across R is nonzero (either positive or negative). In some embodiments, the PLC-induced voltage across resistor R may serve a dual purpose. The PLC signal may provide operational information to controller 710 by varying the voltage drop across resistor R. Additionally, in some embodiments, the PLC signal may provide operational power to controller 710. Controller 710 may draw power from the resonant circuit comprising resistor R, capacitor C3 and inductor L4, and use the drawn power to set the state of transistor Q2.

Implementing auxiliary power circuit 715 as illustrated in FIG. 7H may provide certain advantages. For example, auxiliary power circuit 715 of FIG. 7H may double as a communication device, reducing the total component count in power device 702c. Furthermore, integrating control and power signals may reduce the complexity required to program controller 710. For example, an 'ON' signal may be broadcast by a system controller at a high power, and an 'OFF' signal may be broadcast by a system controller at low power. Auxiliary power circuit 715 may directly apply the converted power signal to the gate of transistor Q2, wherein the power of the 'ON' signal may be sufficient to hold Q2 in the ON state, and the power of the 'OFF' signal might not be sufficient to hold Q2 in the ON state.

Elements of auxiliary power circuits 704a, 704b and 715 may be variously combined. For example, auxiliary power circuit 714 of FIG. 7B may be added to power device 702a of FIG. 7A, auxiliary power circuit 714 functioning as a PLC circuit as well as being configured to provide power to controller 710 in case of a malfunction in auxiliary power circuit 704. In some embodiments, auxiliary power circuit 714 may provide initial power to controller 710 at system setup, with auxiliary power circuit 704 providing power to controller 710 during "steady state" operation.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another. It is noted that various connections are set forth between elements herein. These connections are described in general and, unless specified otherwise, may be direct or indirect; this specification is not intended to be limiting in this respect. Further, elements of one embodiment may be combined with elements from other embodiments in appropriate combinations or subcombinations. For example, PV power device circuitry of one embodiments may be combined with and/or exchanged for power device circuitry of a different embodiment. For example, system power device 508 of FIG. 5A may be used as load 109 of FIGS. 1A and 1B, and string 535 of FIG. 5J may be used instead of or in addition to strings 505 of FIG. 5A.

What is claimed is:

1. A system comprising:
   a first string portion comprising a first group of power sources that are directly connected to each other in series;
   a second string portion connected in series to the first string portion, the second string portion comprising:
      a plurality of devices that are serially connected, and
      a second group of power sources,
   wherein each device of the plurality of devices is coupled to:
      a respective power source of the second group of power sources, and
      a respective adjacent device of the plurality of devices, and
   wherein each device of the plurality of devices comprises:
      a switch;
      a communication circuit configured to receive one or more signals; and
      a controller configured to operate the device in one of a first mode or in a second mode, based on the one or more signals received via the communication circuit, wherein the controller is further configured to:
         in the first mode, disconnect the respective power source of the second group of power sources from the first group of power sources by controlling the switch to be in a first state, and
         in the second mode, connect the respective power source of the second group of power sources to the first group of power sources by controlling the switch to be in a second state.

2. The system of claim 1, wherein the first state is an OFF state, and the second state is an ON state.

3. The system of claim 1, wherein each device of the plurality of devices further comprises a bypass diode configured to, in the first mode, bypass the device.

4. The system of claim 1, wherein each device of the plurality of devices further comprises a second switch, and wherein, for each device of the plurality of devices, the controller is further configured to:
   in the first mode, bypass the device by controlling the second switch.

5. The system of claim 4, wherein, for each device of the plurality of devices, the controller is further configured to:
   in the second mode, allow voltage provided by the respective power source of the second group of power sources to flow to the first group of power sources by controlling the second switch.

6. The system of claim 1, wherein each device of the plurality of devices further comprises a sensor configured to sense an electrical parameter associated with the device, and
   wherein, for each device of the plurality of devices, the controller is further configured to control, based on the electrical parameter, the switch.

7. The system of claim 1, wherein, for each device of the plurality of devices, the controller is further configured to control the device to operate in one of the first mode or the second mode further based on reception or lack of the reception of the one or more signals via the communication circuit.

8. The system of claim 1, wherein the one or more signals comprise at least one of an enable signal or a disable signal.

9. The system of claim 1, wherein each device of the plurality of devices further comprises a second switch, and
   wherein, for each device of the plurality of devices, the controller is further configured to:
      in a third mode, reduce a voltage across the respective power source of the second group of power sources by controlling the second switch.

10. The system of claim 1, further comprising a system power device external to the plurality of devices, wherein the system power device comprises a direct current (DC) to alternating current (AC) converter.

11. The system of claim 10, wherein the system power device is configured to:
    signal the plurality of devices to operate in the first mode based on an input current to the system power device being below a threshold; or
    signal the plurality of devices to operate in the second mode based on the input current to the system power device being above the threshold.

12. The system of claim 1, wherein, for each device of the plurality of devices, the controller is further configured to:
    in a third mode, control the switch to alternate between the first state and the second state at a duty cycle and a frequency to provide an average direct current (DC) voltage.

13. A method comprising:
    in a first mode, disconnecting a power source, connected to a device of a plurality of devices, from a first group of power sources by controlling a switch of the device to be in a first state; and in a second mode, connecting the power source to the first group of power sources by controlling the switch to be in a second state, wherein:

the first group of power sources are directly connected to each other in series, the plurality of devices are serially connected, the first group of power sources are connected in series to the plurality of devices, and each device of the plurality of devices is connected to a respective power source.

14. The method of claim 13, wherein the device further comprises a second switch, the method further comprising:

in the first mode, bypassing the device by controlling the second switch to be in the first state; and in the second mode, connecting a voltage provided by the power source to the first group of power sources by controlling the second switch to be in the second state.

15. The method of claim 13, further comprising:

sensing, using a sensor, an electrical parameter associated with the device, and controlling the switch based on the electrical parameter.

16. The method of claim 13, further comprising:

controlling the device to operate in one of the first mode or the second mode based on reception or lack of the reception of one or more signals.

17. The method of claim 16, wherein the one or more signals comprise at least one of an enable signal or a disable signal.

18. The method of claim 16, wherein the one or more signals are received from a system power device, and wherein the system power device is configured to signal the plurality of devices to:

operate in the first mode based on an input current to the system power device being below a threshold; or operate in the second mode based on the input current to the system power device being above the threshold.

19. The method of claim 13, wherein the device further comprises a second switch, and wherein the method further comprises:

in a third mode, reducing a voltage across the power source by controlling the second switch.

20. The method of claim 13, further comprising:

in a third mode, controlling the switch to alternate between the first state and the second state at a duty cycle and a frequency to provide an average direct current (DC) voltage.

* * * * *